(12) United States Patent
Sarikaya et al.

(10) Patent No.: US 11,568,863 B1
(45) Date of Patent: Jan. 31, 2023

(54) SKILL SHORTLISTER FOR NATURAL LANGUAGE PROCESSING

(71) Applicant: Amazon Technologies, Inc., Seattle, WA (US)

(72) Inventors: Ruhi Sarikaya, Redmond, WA (US); Dongchan Kim, Seattle, WA (US); Young-Bum Kim, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/934,478

(22) Filed: Mar. 23, 2018

(51) Int. Cl.
| | |
|---|---|
| G10L 15/22 | (2006.01) |
| G10L 15/02 | (2006.01) |
| G10L 15/18 | (2013.01) |
| G10L 15/06 | (2013.01) |

(52) U.S. Cl.
CPC .............. *G10L 15/22* (2013.01); *G10L 15/02* (2013.01); *G10L 15/063* (2013.01); *G10L 15/18* (2013.01); *G10L 2015/223* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,774,860 A * | 6/1998 | Bayya | ............... | G10L 15/22 700/246 |
| 8,140,334 B2 * | 3/2012 | Jeong | ............... | G10L 15/142 704/239 |
| 9,135,561 B2 * | 9/2015 | Vadlamani | ............. | G06N 5/022 |
| 9,495,962 B2 * | 11/2016 | Govrin | ............... | G06Q 40/02 |
| 10,331,402 B1 * | 6/2019 | Spector | ............... | G06F 16/951 |
| 10,410,626 B1 * | 9/2019 | Sherstinsky | ........... | G06Q 30/01 |
| 2002/0107690 A1 * | 8/2002 | Souvignier | ............. | G10L 15/18 704/251 |
| 2012/0245919 A1 * | 9/2012 | Aradilla | ............... | G10L 15/187 704/2 |
| 2014/0040748 A1 * | 2/2014 | Lemay | ............... | G06F 3/167 715/728 |
| 2014/0222436 A1 * | 8/2014 | Binder | ................. | G10L 15/265 704/275 |
| 2014/0365885 A1 * | 12/2014 | Carson | ............... | G06F 3/04842 715/708 |

(Continued)

FOREIGN PATENT DOCUMENTS

JP 2009253970 A * 10/2009 ........... G06F 1/1684

*Primary Examiner* — Mohammad K Islam
(74) *Attorney, Agent, or Firm* — K&L Gates LLP

(57) ABSTRACT

Devices and techniques are generally described for application determination in speech processing. Input data corresponding to a spoken utterance may be received. Speech recognition processing may be performed on the input data to generate text data. A machine learning encoder may generate a vector representation of the input data. A first binary classifier may determine a first probability that the input data corresponds to a first speech-processing application. A second binary classifier may determine a second probability that the input data corresponds to a second speech-processing application. A selection between the first speech-processing application and the second speech-processing application may be made based at least in part on the first probability and the second probability.

23 Claims, 8 Drawing Sheets

(56) References Cited

U.S. PATENT DOCUMENTS

| | | | | |
|---|---|---|---|---|
| 2015/0019204 A1* | 1/2015 | Simard | .................. | G06F 40/30 704/9 |
| 2015/0066479 A1* | 3/2015 | Pasupalak | ........... | G06F 16/9535 704/9 |
| 2015/0193379 A1* | 7/2015 | Mehta | .................... | G10L 15/00 704/9 |
| 2016/0110071 A1* | 4/2016 | Brown | .................... | G06F 3/165 715/758 |
| 2016/0148612 A1* | 5/2016 | Guo | ...................... | G06F 40/237 704/257 |
| 2016/0188565 A1* | 6/2016 | Robichaud | .......... | G06F 16/3349 704/9 |
| 2016/0253434 A1* | 9/2016 | Yu | ...................... | G06F 17/2785 707/760 |
| 2017/0162197 A1* | 6/2017 | Cohen | .................... | G06F 3/012 |
| 2017/0308389 A1* | 10/2017 | Ducatelle | ............... | G06F 3/167 |
| 2017/0316775 A1* | 11/2017 | Le | ........................... | G10L 15/16 |
| 2018/0018959 A1* | 1/2018 | Des Jardins | .......... | G10L 15/005 |
| 2018/0068031 A1* | 3/2018 | Hewavitharana | ...... | G06N 3/006 |
| 2018/0143967 A1* | 5/2018 | Anbazhagan | ............ | G06F 8/30 |
| 2018/0144046 A1* | 5/2018 | Braga | ................. | G06F 16/3329 |
| 2018/0165596 A1* | 6/2018 | Abrams | ................. | G06N 20/00 |
| 2018/0190272 A1* | 7/2018 | Georges | ................. | G10L 15/22 |
| 2018/0261203 A1* | 9/2018 | Zoller | ................... | G10L 13/027 |
| 2018/0314689 A1* | 11/2018 | Wang | .................. | G10L 15/1822 |
| 2019/0005021 A1* | 1/2019 | Miller | ..................... | G10L 15/26 |
| 2019/0027147 A1* | 1/2019 | Diamant | ............... | G10L 15/265 |
| 2019/0042561 A1* | 2/2019 | Kakirwar | ................ | G10L 15/22 |
| 2019/0057693 A1* | 2/2019 | Fry | ........................ | G10L 15/22 |
| 2019/0065498 A1* | 2/2019 | Yuan | .................... | G06F 16/90332 |
| 2019/0065556 A1* | 2/2019 | Kumar | ................ | G06Q 30/0613 |
| 2019/0130248 A1* | 5/2019 | Zhong | ..................... | G06F 16/93 |
| 2019/0130286 A1* | 5/2019 | Salameh | ................ | G06N 5/022 |
| 2019/0156220 A1* | 5/2019 | Zhu | ........................ | G06N 5/041 |
| 2019/0156222 A1* | 5/2019 | Emma | .................. | G06N 3/006 |
| 2019/0236464 A1* | 8/2019 | Feinson | ................. | G06N 20/00 |
| 2019/0237068 A1* | 8/2019 | Canim | .................. | G06F 16/337 |
| 2019/0279627 A1* | 9/2019 | Wang | ................. | G10L 15/1815 |
| 2019/0279633 A1* | 9/2019 | Venkata | ................ | G10L 15/22 |
| 2019/0318735 A1* | 10/2019 | Chao | ................... | G10L 15/005 |
| 2019/0325081 A1* | 10/2019 | Liu | ................... | G06F 16/24575 |

* cited by examiner

US 11,568,863 B1

SKILL SHORTLISTER FOR NATURAL LANGUAGE PROCESSING

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wake-word" or "wake command". Natural language processing is used to translate the spoken commands into computer-executable instructions. The executable instructions are executed and a corresponding task is performed. Such speech recognition and voice control may be used by personal computers, hand-held devices, telephone computer systems, and a wide variety of other computing devices to improve human-computer interactions.

DETAILED DESCRIPTION

Figure 1:
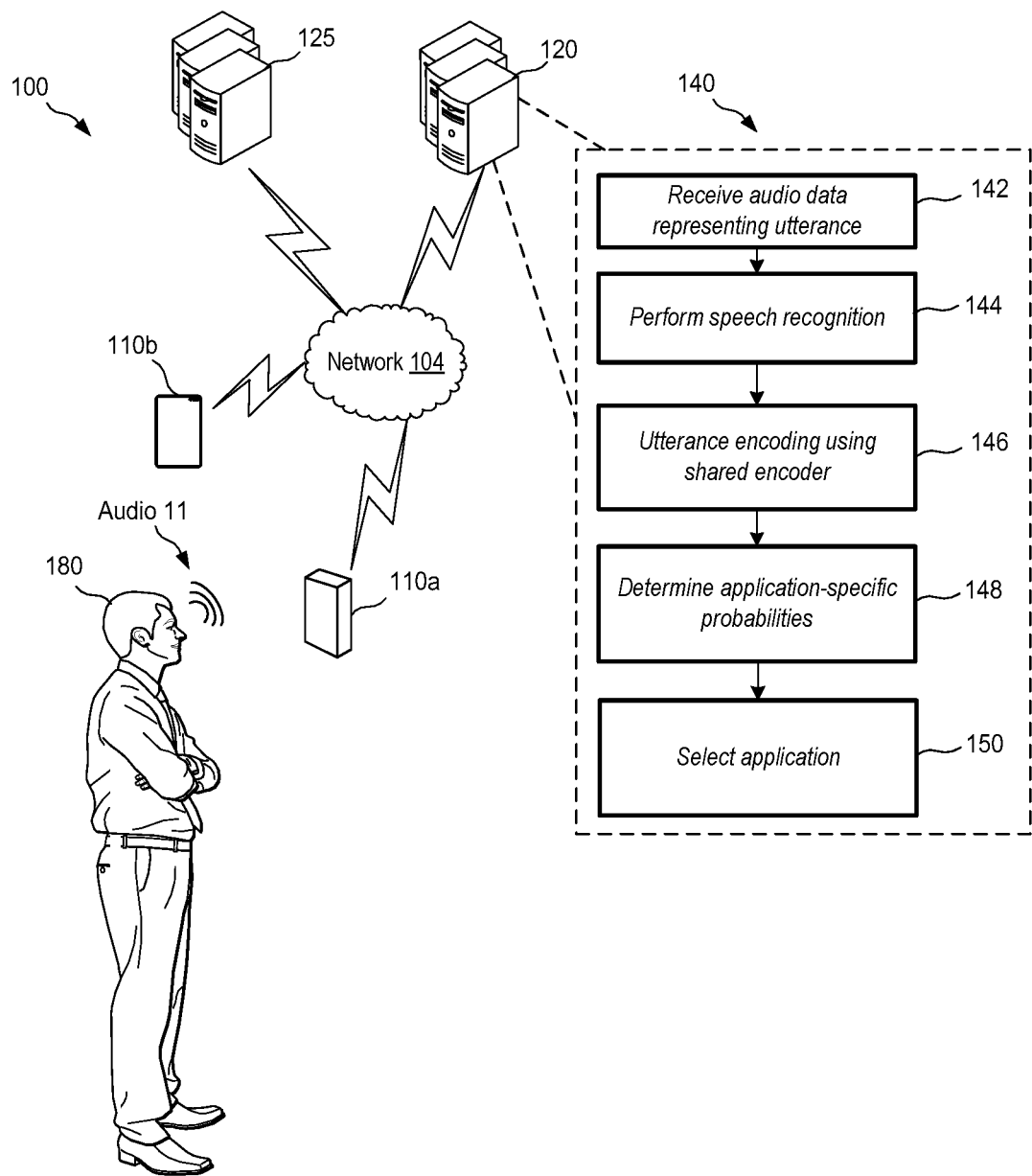
FIG. 1 is a conceptual illustration of a system configured to perform application selection in speech processing according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, rather than specific commands or instructions. Text-to-speech (TTS) is a field of computer science, artificial intelligence, and linguistics concerned with enabling computers to output synthesized speech. ASR, NLU, and TTS may be used together as part of a speech processing system.

A speech-controlled computing system may answer user commands requesting the output of content. For example, a user may say "Computer, what is the weather." In response, the system may output weather information. For further example, a user may say "Computer, play music from the 90's." In response, the system may output music from the 1990's.

The system may be configured with multiple applications (e.g., thousands, tens of thousands, or more applications) that can be used to potentially respond to a user command. For example, the system may include weather applications, music applications, video applications, calendar applications, timer applications, general knowledge answering applications, game applications, etc. Further, the system may be capable of operating many different applications that have an overlapping subject matter. For example, the system may include more than one application that can execute commands related to requests for weather information. For further example, the system may include one or more medical information applications that execute commands requesting medical information. Determining which application or applications may be applicable to handle an incoming user command is a non-trivial determination.

The system may determine, in parallel, which of the entirety of the system's applications may potentially execute a given command. For example, when the system receives a command, the system may determine, for each application, the portions of the command that may be relevant to the application's execution of the command as well as one or more intents related to the particular application to which the command potentially relates. In various examples, determining a subset or "shortlist" of applications that are potentially applicable to handle (e.g., perform named entity resolution and/or intent classification) a given command may reduce the amount of computing resources consumed and may lead to reduced latency from when the user speaks a command to when execution of the command actually occurs.

In accordance with embodiments of the present disclosure, speech-controlled computing systems may determine respective probabilities that applications are appropriate to handle a particular user utterance and/or other user input. In various examples, the probabilities may be used to generate a subset or "shortlist" of applications that are most likely to be applicable to the user utterance or most likely to have been targeted by the user when speaking the command. Various techniques may be used for generating a vector representation of an input utterance prior to performing natural language processing. The vector representation may be used to generate probability scores for each of a plurality of applications (e.g., for a set of applications for which a machine learning model has been trained). The probability scores may be sorted to determine a subset, or "shortlist," of applications that are most likely to have been intended by the user and be effective to accept the utterance as an input and to perform an action in response to the input.

After determination of the shortlist of potentially applicable applications, the utterance (and/or a textual representation of the utterance) may be sent to an NLU component for further semantic understanding of the utterance and provided to one or more of the applications in the subset of applications. As a result, the frequency of situations in which a system calls on an application to execute a command and the application returns inadequate results or no results at all may be reduced. Additionally, the teachings of the present disclosure may reduce the latency, memory footprint, and/or computational load of a speech processing system by reducing the number of applications to be evaluated for a particular utterance. Although many examples described herein relate to the detection of user-spoken utterances, various embodiments utilizing the shortlisting of applications may be equally applicable to text-based or other forms of user input. Accordingly, use of the term "utterance" herein includes input text in addition to recorded audio of user speech. Additionally, in at least some examples, "natural language information" may be detected and evaluated in accordance with the various techniques described herein. Natural language information may include user-spoken utterances, user input text, and/or various other user-input signals that relate to natural language.

The number of applications supported by speech-controlled or voice services that can be incorporated into computing devices as personal assistants is continually increasing as application developers generate new applications (sometimes referred to herein as "skills"). These skills provide a response or execute a function in response to the user's voice commands. Various types of skills are possible. In some cases, the invocation of a skill by a user's utterance may include a query that is provided to a cloud-based software application. That application may receive the query as an input and generate an answer in response to that query. The answer may then be transmitted back to the speed-controlled hardware device and provided to the user in the form of a computer-generated spoken response. One example of this could be the user utterance, "Computer, what is the weather today?" That query would be forwarded to a weather forecasting application or service, which will retrieve the weather forecast cause the hardware device to say, "Today will be rainy with a high of 62 degrees."

In other cases, the invocation of a skill by a user's utterance may include a request that an action be taken. That request can be transmitted to a control system that will cause that action to be executed. For example, the user's utterance may be, "Computer, turn on the living room lights." In response, a "smart home" system may cause the lights in the user's living room to turn on. Examples of skills include voice-enabled applications invoked by the Siri virtual personal assistant from Apple Inc. of Cupertino, Calif., voice-enabled actions invoked by the Google Assistant virtual personal assistant from Google LLC of Mountain View, Calif., or voice-enabled skills invoked by the Alexa virtual personal assistant from Amazon.com, Inc. of Seattle, Wash. The number of applications/skills continues to grow and the rate of growth is increasing as developers become more accustomed to application programming interfaces (APIs) and application development kits provided for the voice service. Rule-based approaches and/or predefined utterance matching have been used in some systems for processing commands spoken in a certain format to invoke a particular application. The system (or an application) may require that the user's utterances conform to a predefined invocation pattern, such as "[Wake word], ask [application] to [payload]." One example could be, "Computer, ask Taxi Company to book me a ride to the library," with "Computer" being the wake word, "Taxi Company" being the application, and "book me a ride to the library" being the payload which is used by the Taxi Company application as a command input. While such predefined command structures may ease system processing in identifying the applicable application, inflexible command structures may also limit user freedom with regard to selecting a particular application or may be burdensome as users may need to memorize specific invocation patterns for a variety of different applications. It may be desirable to reduce the cognitive burden on a user to remember the exact structure required to invoke a specific application by enabling a user to invoke specific applications using natural language speech. This may allow for a reduction in the amount of computing resources needed to consider a large number of potential applications for each incoming command.

In various previous approaches, statistical NLU may be used to reduce the cognitive burden on the user. In an NLU-based approach, user utterances are typically classified into one of the supported skills (or into an unsupported skill) followed by further skill-dependent intent and slot analyses (e.g., intent classification and entity extraction).

However, such an approach may become a bottleneck when scaling to a large number of applications. A first scaling issue may arise when new applications are added into a system with an existing catalog of supported applications. In some examples, application and/or domain classifiers may be modeled as a multi-classification task. Each time a new application is introduced, the entire model may be retrained with the new applications as well as the existing applications. When a large number of applications are being added over time (especially at increasing rates), it may be advantageous to train individually-added applications/skills as opposed to training the entire model (including all previously-added and newly-added applications/skills) to reduce memory footprint and conserve computational resources. Additionally, training individual skills as opposed to retraining the entire joint model may reduce the amount of training-related downtime of the overall system.

Vocabulary overlap among applications increases as more applications are supported. In some cases, vocabulary overlap among different applications results from independent application development (e.g., by third party developers) without consideration of existing applications. In addition, as the number of supported applications increases into the tens of thousands, the available number of unique combinations of vocabulary words for invoking the applications decreases. The various techniques described herein may improve the ability to determine the intended and/or best-suited applications for incoming requests. In addition the approaches described herein may offer increased ability to resolve ambiguity between various applications in existing systems that compare utterances to static catalogs (e.g., "gazetteers"). In various examples described herein, a list of user-enabled applications, which may be a subset of the total number of applications supported by the voice service, may be provided to the speech processing system in order to determine a set of probabilities of respective applications being appropriate for handling an incoming request. In some examples, the set of probabilities may, in turn, be used to determine a subset of potentially applicable applications (sometimes referred to herein as a "shortlist") for a given utterance.

Figure 3:
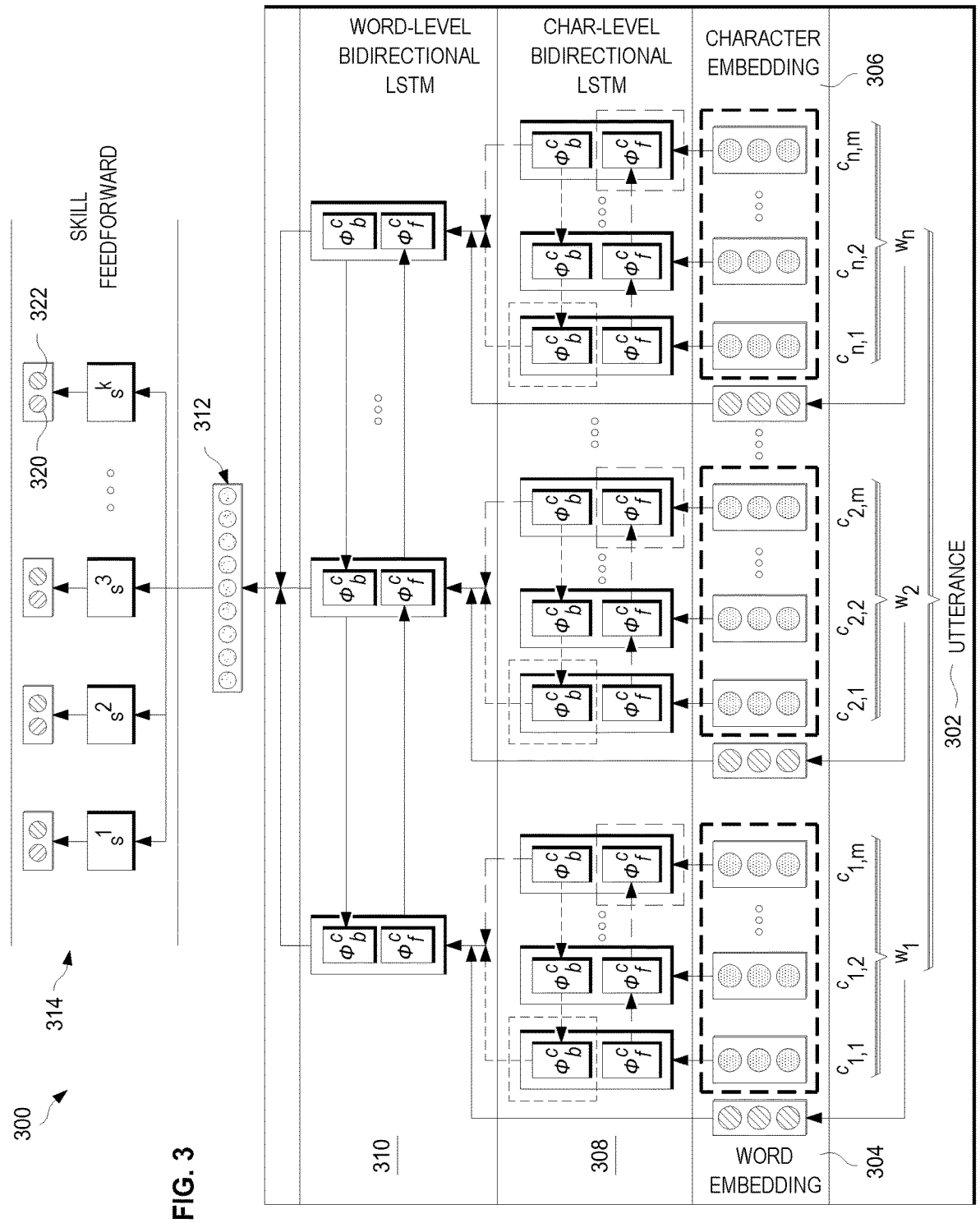
FIG. 3 is a conceptual diagram showing various components of a shortlister, in accordance with various embodiments described herein.

In various examples described herein, scalability issues may be addressed using multi-task learning systems wherein each application's binary classification is addressed separately. Additionally, in the examples described herein, a user utterance is encoded using a skill-independent neural network (sometimes referred to herein as an "utterance encoder") comprising a shared orthography-sensitive, character-based bidirectional long short-term memory (BiL- STM) model along with a shared word-level, token-based BiLSTM model that generates contextual vector representation data for words in a given utterance. The utterance encoder may be trained jointly for a set of applications. Thereafter, when new applications are added, the new applications may be individually trained without modifying weights of the previously-trained utterance encoder. For a given utterance, the utterance encoder may determine the utterance embedding (e.g., a vector representation data representing the utterance). Based on the utterance embedding, each application may apply a logistic regression layer specifically trained for the particular application. FIG. 3 (described in further detail below) depicts an example model in additional detail.

FIG. 1 illustrates a system 100 configured to perform application selection in speech processing according to various embodiments of the present disclosure. Although the figures and discussion illustrate certain operational steps of the system 100 in a particular order, in other embodiments the steps described may be performed in a different order (as well as certain steps removed or added). As shown in FIG. 1, the system 100 includes one or more computing devices 110 (e.g., devices 110a-110b) local to a user 180, one or more speech processing computing devices 120, and one or more application computing devices 125 in communication with each other across one or more networks 104. The speech processing computing device(s) 120 (which may be one or more different physical devices) may be capable of performing speech processing (e.g., ASR and NLU) as well as non-speech processing operations as described herein. A single computing device 120 may perform all speech processing or multiple computing devices 120 may combine to perform all speech processing.

As shown in FIG. 1, a device 110a may receive audio 11 including a spoken utterance of a user 180 via a microphone (or array of microphones) of the device 110a. The device 110a generates input audio data corresponding to the audio 11, and sends the input audio data to the computing device(s) 120 for processing. Alternatively, a device 110b may receive text input by the user 180 via either a physical keyboard or virtual keyboard presented on a touch sensitive display of the device 110b. The device 110b generates input text data corresponding to the text, and sends the input text data to the computing device(s) 120 for processing. In other embodiments, the device 110b may detect spoken commands and perform speech recognition processing locally at the device 110b in order to translate those spoken commands into text data, which the device 110b then sends to the computing device 120.

The speech processing computing device 120 receives input data from a device (110a/110b). If the input data is the input audio data from the device 110a, the computing device(s) 120 performs speech recognition processing (e.g., ASR) on the input audio data to generate input text data. The computing device(s) 120 may determine a shortlist of applicable applications for a given utterance embedding, as described in further detail below. The computing device(s) 120 performs natural language processing on input text data (either received from the device 110b or generated from the input audio data received from the device 110a) to determine a user command. A user command may correspond to a user request for the system to output content to the user. The requested content to be output may correspond to music, video, search results, weather information, etc.

The computing device(s) 120 determines output content responsive to the user command. The output content may be received from a first party (1P) application (e.g., an application controlled or managed by the voice service computing device(s) 120 or by the company or entity controlling the voice service computing device(s) 120) or a third party (3P) application (e.g., an application managed by an application computing device(s) 125 in communication with the computing device(s) 120 but not controlled or managed by the computing device(s) 120 or by the entity controlling the voice service computing device(s) 120). The computing device(s) 120 sends back to the initiating device (110a/110b) output data including the output content responsive to the user command. The device (110/110b) may emit the output data as audio, present the output data on a display, or perform some other operation responsive to the user command.

The computing device(s) 120 may determine output content responsive to the user command by performing an action. For example, in response to the user command, the computing device(s) 120 may determine one or more actions that correspond to the user command and may select one of the actions to perform. Examples of actions include launching an application (e.g., sending dialog data or other data to a specific application to be processed, which may correspond to a dispatch request), performing disambiguation (e.g., determining that the computing device(s) 120 doesn't have enough information to execute a command and generating a dialog request that requests additional information from the user), confirming the action with a user (e.g., generating audio data and/or display data indicating the action to be performed and requesting confirmation from the user), displaying information to the user (e.g., generating display data in response to the user command, such as displaying a second page of content), playing audio information for the user (e.g., generating audio data in response to the user command, such as indicating that the application is being launched, that a volume has been changed, and/or the like), or the like.

The device 110a may, thereafter, receive second audio including a spoken utterance of a user 180 captured by a microphone (or array of microphones) of the device 110a. The device 110a generates second input audio data corresponding to the second audio 11, and sends the second input audio data to the computing device(s) 120 for processing. Alternatively, the device 110b may receive second text input by the user 180. The device 110b generates second input text data corresponding to the second text, and sends the second input text data to the computing device(s) 120 for processing.

Computing device(s) 120 may be effective to perform one or more actions of a process flow 140 in accordance with various embodiments described herein. The actions of the process flow 140 may represent a series of instructions comprising computer-readable machine code executable by one or more processing units of computing device(s) 120. In various examples, the computer-readable machine codes may be comprised of instructions selected from a native instruction set of computing device(s) 120 and/or an operating system of computing device(s) 120.

In various examples, the process flow 140 may begin at action 142, "Receive audio data representing utterance". At action 142, computing device(s) 120 may receive audio data (e.g., audio 11). The audio may represent an utterance by user 180 and may be a request for a speech-controlled voice personal assistant client executing on device 110a and/or 110b to generate a response and/or perform an action. In various examples, device 110a and/or 110b may generate the audio data representing the utterance in response to detection of a wake word spoken by the user 180. The device 110a and/or 110b may send the audio data representing the utterance over network 104 to computing device(s) 120 (and/or to computing device(s) 125) for further processing. In various other examples, instead of audio data, computing device(s) 120 may receive text data. In at least some examples where computing device(s) 120 receives text data, action 144 may be omitted.

In some examples, the process flow 140 may continue from action 142 to action 144, "Perform speech recognition". As described in further detail below in reference to FIG. 2, a speech recognition component (e.g., speech recognition component 249) may transcribe the audio data representing the utterance into text data representing words of speech contained in the audio data. For example, the speech recognition component may interpret the spoken utterance of user 180 based on a similarity between the spoken utterance and pre-established language models. For example, the speech recognition component may compare the audio data with models for sounds (e.g., subword units or phonemes) and sequences of sounds to identify words that match the sequence of sounds spoken in the utterance of the audio data.

In further examples, the process flow 140 may continue from action 144 to action 146. At action 146, the utterance may be encoded using a shared utterance encoder. The utterance encoder may be "shared" in the sense that the utterance encoder is not specific to any speech-processing application (sometimes referred to herein as a "skill"). The shared utterance encoder may receive the text data (e.g., text data representing the utterance received from a speech recognition component or text data generated by a user device 110a/110b) and may generate a character-sensitive and context-sensitive word representation vector data representing the utterance based on word-level embedding and character-level embedding of the text data. The shared utterance encoder may use two BiLSTM layers to generate the vector data representing the utterance. The shared utterance encoder is described in further detail below in reference to FIG. 3.

In various other examples, the process flow 140 may continue from action 146 to action 148, "Determine application-specific probabilities." At action 148, the vector data representing the utterance generated by the shared utterance encoder may be sent to an application-specific feedforward machine learning layer (e.g., an "application-specific feedforward layer" or "skill-specific feedforward layer"). The application-specific feedforward layer may comprise a plurality of application-specific classifiers (sometimes referred to herein as "application classifiers") that are each trained to determine a probability that a particular speech-processing application (corresponding to a respective classifier) is appropriate to process the utterance represented by the vector data output of the shared utterance encoder to generate response data. The application-specific feedforward layer is described in further detail below in reference to FIG. 3. In various examples, computing device(s) 120 may determine a subset or "shortlist" of applications that are appropriate to process a user utterance based on the application-specific probabilities determined at action 148.

In various examples, processing may continue from action 148 to action 150. At application 150, computing device(s) 120 may be effective to select a speech-processing application to be included in natural language processing of the user utterance or input text data. In at least some examples, the speech-processing application may execute on computing device(s) 120, while in other examples the speech-processing application may execute on application computing device(s) 125. In at least some examples, various speech processing components of computing device(s) 120 may be effective to select the speech-processing application based at least in part on the application-specific probabilities and/or shortlist of applications determined at action 148. Various examples of application selection based on probabilities such as those generated at action 148 are discussed in further detail below in reference to FIGS. 3 and 4.

Figure 2:
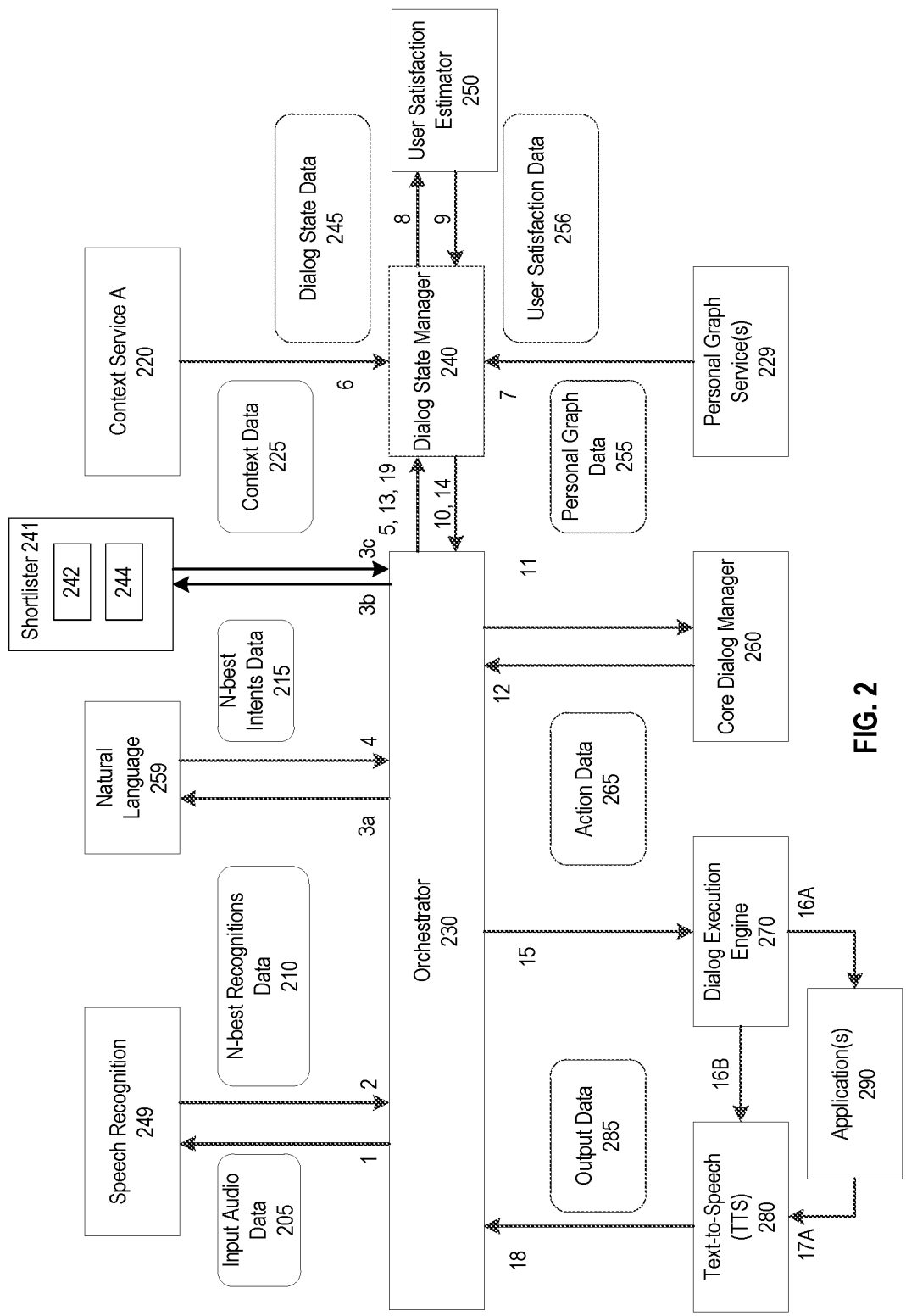
FIG. 2 is a conceptual diagram of components of a speech-processing device(s) according to various embodiments of the present disclosure.

The system may operate using various components as illustrated in and described with respect to FIG. 2. The various components illustrated in FIG. 2 may be located on a same or different physical device. Communication between various components illustrated in FIG. 2 may occur directly or across a network(s) 104.

An audio capture component, such as a microphone or array of microphones of a device 110, captures the input audio 11 corresponding to a spoken utterance. The device 110, using a wakeword detection component, processes audio data corresponding to the input audio 11 to determine if a keyword (e.g., a wakeword) is detected in the audio data. Following detection of a wakeword, the device 110 sends audio data corresponding to the utterance, to a computing device(s) 120 for processing.

Upon receipt by the computing device(s) 120, the audio data may be sent to an orchestrator component 230. The orchestrator component 230 may include memory and logic that enable the orchestrator component 230 to transmit various pieces and forms of data to various components of the system.

The orchestrator component 230 sends the audio data to a speech processing component 240. A speech recognition component 249 of the speech processing component 240 transcribes the audio data into text data representing words of speech contained in the audio data. The speech recognition component 249 interprets the spoken utterance based on a similarity between the spoken utterance and pre-established language models. For example, the speech recognition component 249 may compare the audio data with models for sounds (e.g., subword units or phonemes) and sequences of sounds to identify words that match the sequence of sounds spoken in the utterance of the audio data.

Orchestrator 230 may send the results of speech recognition processing (e.g., text data representing speech) to shortlister component 241. Shortlister component 241 may comprise utterance encoder 242 and application-specific feedforward layer 244. Utterance encoder 242 may be effective to output an application-independent vector data representing the utterance (e.g., the text data representing the utterance, as generated by speech recognition component 249). The application-specific feedforward layer 244 receives the application-independent vector data representing the utterance. In the application-specific feedforward layer 244, each application of a set of applications (e.g., the applications for one or more domains) applies a logistic regression layer specifically trained for the application to determine a set of probabilities (e.g., a respective probability for each application of the application-specific feedforward layer 244). Each probability represents a likelihood that the particular application is appropriate to process the utterance. Thereafter, in some examples, the shortlister component 241, orchestrator 230, natural language component 259, and/or another processing component of computing device(s) 120, may determine a subset of the applications for which the utterance is appropriate by ranking or otherwise sorting the applications based on the determined probabilities for each application. Additionally, shortlister component 241 may determine a probability that the utterance is inapplicable to the current domain (e.g., to the current set of applications for which the shortlister component 241 has been trained). The subset of applications and/or the probabilities generated by shortlister 241 may be provided to the natural language component 259 to reduce the computational load of the natural language component 259 when determining an appropriate application to process the utterance. Shortlister component 241 is described in further detail below in reference to FIGS. 4 and 5.

Results of speech recognition processing (e.g., text data representing speech) are processed by a natural language component 259 of the speech processing component 240. The natural language component 259 attempts to make a semantic interpretation of the text data. That is, the natural language component 259 determines the meaning behind the text data based on the individual words in the text data and then implements that meaning. The natural language component 259 interprets a text string to derive an intent or a desired action from the user as well as the pertinent pieces of information in the text data that allow a device (e.g., the device 110, the computing device(s) 120, the application computing device(s) 125, etc.) to complete that action. For example, if a spoken utterance is processed using the speech recognition component 249, which outputs the text data "call mom", the natural language component 259 may determine the user intended to activate a telephone in his/her device and to initiate a call with a contact matching the entity "mom."

The natural language component 259 may be configured to determine a "domain" of the utterance so as to determine and narrow down which services offered by an endpoint device (e.g., the computing device(s) 120 or the device 110) may be relevant. For example, an endpoint device may offer services relating to interactions with a telephone service, a contact list service, a calendar/scheduling service, a music player service, etc. Words in a single textual interpretation may implicate more than one service, and some services may be functionally linked (e.g., both a telephone service and a calendar service may utilize data from a contact list). In various examples, a domain may be associated with a set of applications. In various examples, some applications may be specific to a particular domain. In some examples, other applications may be applicable to multiple domains. In various examples, the probabilities generated by shortlister 241 may be used by natural language component 259 to determine the domain of the utterance.

The natural language component 259 may include a recognizer that includes a named entity resolution (NER) component configured to parse and tag to annotate text as part of natural language processing. For example, for the text "call mom," "call" may be tagged as a command to execute a phone call and "mom" may be tagged as a specific entity and target of the command. Moreover, the telephone number for the entity corresponding to "mom" stored in a contact list may be included in the NLU results. Further, the natural language component 259 may be used to provide answer data in response to queries, for example using a natural language knowledge base.

In natural language processing, a domain may represent a discrete set of activities having a common theme, such as "shopping," "music," "calendaring," "communications," etc. As such, each domain may be associated with a particular recognizer, language model and/or grammar database, a particular set of intents/actions, and a particular personalized lexicon. Each gazetteer may include domain-indexed lexical information associated with a particular user and/or device. A user's music-domain lexical information (e.g., a gazetteer associated with the user for a music domain) might correspond to album titles, artist names, and song names, for example, whereas a user's contact-list lexical information (e.g., a gazetteer associated with the user for a contact domain) might include the names of contacts. Since every user's music collection and contact list is presumably different, this personalized information improves entity resolution. A lexicon may represent what particular data for a domain is associated with a particular user. The form of the lexicon for a particular domain may be a data structure, such as a gazetteer. A gazetteer may be represented as vector data with many bit values, where each bit indicates whether a data point associated with the bit is associated with a particular user. For example, a music gazetteer may include one or more long vectors, each representing a particular group of musical items (such as albums, songs, artists, etc.) where the vector includes positive bit values for musical items that belong in the user's approved music list. Thus, for a song gazetteer, each bit may be associated with a particular song, and for a particular user's song gazetteer the bit value may be 1 if the song is in the particular user's music list. Other data structure forms for gazetteers or other lexicons are also possible.

As noted above, in traditional natural language processing, text data may be processed applying the rules, models, and information applicable to each identified domain. For example, if text represented in text data potentially implicates both communications and music, the text data may, substantially in parallel, be natural language processed using the grammar models and lexical information for communications, and natural language processed using the grammar models and lexical information for music. The responses based on the text data produced by each set of models is scored, with the overall highest ranked result from all applied domains being ordinarily selected to be the correct result. The shortlister component 241 may reduce the computational burden of the natural language processing 259 by processing the text data based on the application-specific probabilities determined by shortlister component 241. For example, natural language processing 259 may be performed for the n applications having the highest probabilities that the application is programmed to process and/or respond to the user utterance and/or the text data.

A downstream process called named entity resolution may link a text portion to an actual specific entity known to the system. To perform named entity resolution, the system may utilize gazetteer information stored in an entity library storage. The gazetteer information may be used for entity resolution, for example matching speech recognition results with different entities (e.g., song titles, contact names, etc.). Gazetteers may be linked to users (e.g., a particular gazetteer may be associated with a specific user's music collection), may be linked to certain domains (e.g., shopping, music, communications), or may be organized in a variety of other ways. The NER component may also determine whether a word refers to an entity that is not explicitly mentioned in the text data, for example "him," "her," "it" or other anaphora, exophora or the like.

A recognizer of the natural language component 259 may also include an intent classification (IC) component that processes text data to determine an intent(s), where the intent(s) corresponds to the action to be performed that is responsive to the user command represented in the text data. Each recognizer is associated with a database of words linked to intents. For example, a music intent database may link words and phrases such as "quiet," "volume off," and "mute" to a "mute" intent. The IC component identifies potential intents by comparing words in the text data to the words and phrases in the intents database. Traditionally, the IC component determines using a set of rules or templates that are processed against the incoming text data to identify a matching intent.

In order to generate a particular interpreted response, the NER component applies the grammar models and lexical information associated with the respective recognizer to recognize a mention of one or more entities in the text represented in the text data. In this manner the NER component identifies "slots" (i.e., particular words in text data) that may be needed for later command processing. Depending on the complexity of the NER component, it may also label each slot with a type (e.g., noun, place, city, artist name, song name, or the like). Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by the IC component are linked to domain-specific grammar frameworks with "slots" or "fields" to be filled. Each slot/field corresponds to a portion of the text data that the system believes corresponds to an entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER component may parse the text data to identify words as subject, object, verb, preposition, etc., based on grammar rules and/or models, prior to recognizing named entities. The identified verb may be used by the IC component to identify intent, which is then used by the NER component to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component then searches the corresponding fields in the domain-specific and personalized lexicon(s), attempting to match words and phrases in the text data tagged as a grammatical object or object modifier with those identified in the database(s). As used herein, "intent data" may correspond to the intent itself, framework(s) for the intent, slot(s)/field(s) corresponding to the intent, object modifier(s), any information associated with the intent/framework(s)/slot(s), or any combination thereof without departing from the disclosure.

To illustrate an example, a command of "book me a plane ticket from Boston to Seattle for July 5" may be associated with a <BookPlaneTicket>intent. The <BookPlaneTicket>intent may be associated with a framework including various slots including, for example, <DepartureDate>, <DepartureLocation>, <ArrivalDate>, and <DestinationLocation>. In the above example, the computing device(s) 120, namely the natural language component 259, may populate the framework as follows: <DepartureDate: July 5>, <DepartureLocation: Boston>, <ArrivalDate: July 5>, and <DestinationLocation: Seattle>.

This process includes semantic tagging, which is the labeling of a word or combination of words according to their type/semantic meaning. Parsing may be performed using heuristic grammar rules, or the NER component may be constructed using techniques such as Hidden Markov models (HMMs), maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component will determine corresponds to the "play music" intent. Additionally, in at least some examples, probability data generated by shortlister 241 may indicate a high likelihood that the "play music" intent is appropriate as the highest probability applications for the user utterance correspond to music applications. At this stage, no determination has been made as to the meaning of "mother's little helper" and "the rolling stones," but based on grammar rules and models, it is determined that the text of these phrases relate to the grammatical object (i.e., entity) of the text data.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component may search a database of generic words associated with the domain. For example, if the text data corresponds to "play songs by the rolling stones," after failing to determine an album name or song name called "songs" by "the rolling stones," the NER component may search the domain vocabulary for the word "songs." In the alternative, generic words may be checked before the gazetteer information, or both may be tried, potentially producing two different results.

The results of natural language processing may be tagged to attribute meaning to the text data. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The results of natural language processing may be sent to an application 290, which may be located on a same or separate computing device 120 as part of a system. The system may include more than one application 290, and the destination application 290 may be determined based on the natural language processing results and may be selected from the subset of applications determined by shortlister component 241 and/or by another component of computing device(s) 120 based on the probabilities determined by shortlister 241. For example, if the natural language processing results include a command to play music, the destination application 290 may be a music playing application, such as one located on the device 110 or in a music playing appliance, configured to execute a music playing command. If the natural language processing results include a search request (e.g., requesting the return of search results), the application 290 selected may include a search engine application, such as one located on a search server, configured to execute a search command and determine search results, which may include output text data to be processed by a text-to-speech engine and output from a device as synthesized speech.

The computing device(s) 120 may include a user recognition component. The user recognition component may take as input the audio data as well as the text data output by the speech recognition component 249. The user recognition component may receive the text data from the speech recognition component 249 either directly or indirectly via the orchestrator component 230. Alternatively, the user recognition component may be implemented as part of the speech recognition component 249. The user recognition component determines respective scores indicating whether the utterance in the audio data was spoken by particular users. The user recognition component also determines an overall confidence regarding the accuracy of user recognition operations. User recognition may involve comparing speech characteristics in the audio data to stored speech characteristics of users. User recognition may also involve comparing biometric data (e.g., fingerprint data, iris data, etc.) received by the user recognition component to stored biometric data of users. User recognition may further involve comparing image data including a representation of at least a feature of a user with stored image data including representations of features of users. It should be appreciated that other kinds of user recognition processes, including those known in the art, may be used. Output of the user recognition component may be used to inform natural language processing as well as processing performed by 1P and 3P applications 290.

The computing device(s) 120 may additionally include a user profile storage. The user profile storage may include data regarding user accounts. The user profile storage may be implemented as part of the computing device(s) 120. However, it should be appreciated that the user profile storage may be located proximate to the computing device(s) 120, or may otherwise be in communication with the computing device(s) 120, for example over the network(s) 104. The user profile storage may include a variety of information related to individual users, accounts, etc. that interact with the system.

FIG. 2 illustrates various 1P applications 290 of the system. However, it should be appreciated that the data sent to the 1P applications 290 may also be sent to 3P application computing device(s) 125 executing 3P applications.

Application, as used herein, may be considered synonymous with a skill. A "skill" may correspond to a domain and may be software running on a computing device(s) 120 and akin to an application. That is, a skill may enable a computing device(s) 120 or application computing device(s) 125 to execute specific functionality in order to provide data or produce some other output called for by a user. The system may be configured with more than one skill. For example a weather service skill may enable the computing device(s) 120 to execute a command with respect to a weather service computing device(s) 125, a car service skill may enable the computing device(s) 120 to execute a command with respect to a taxi service computing device(s) 125, an order pizza skill may enable the computing device(s) 120 to execute a command with respect to a restaurant computing device(s) 125, etc.

While the examples illustrated above describe discrete skills associated with a specific service, the disclosure is not limited thereto and an application (e.g., skill) may be associated with specific and/or general functions, including system functions associated with the computing device(s) 120. For example, the speech processing component 240, the speech recognition component 249, the shortlister component 241, the natural language component 259, or the like may correspond to an application running on the computing device(s) 120 (e.g., the computing device(s) 120 sends input data to the application and the application generates output data). As described herein, the shortlister component 241 may be effective to reduce the number of skills to be evaluated for a given utterance. In general, an application or a skill may refer to a system process running on the computing device(s) 120, a first party application running on the computing device(s) 120, a third party application running on the computing device(s) 120 and/or the application computing device(s) 125, and/or the like without departing from the disclosure.

Output of the application/skill 290 may be in the form of text data to be conveyed to a user. As such, the application/skill output text data may be sent to a text-to-speech (TTS) component 280 either directly or indirectly via the orchestrator component 230. The TTS component 280 may synthesize speech corresponding to the received text data. Speech audio data synthesized by the TTS component 280 may be sent to a device 110 for output to a user.

The TTS component 280 may perform speech synthesis using one or more different methods. In one method of synthesis called unit selection, the TTS component 280 matches the text data or a derivative thereof against a database of recorded speech. Matching units are selected and concatenated together to form speech audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The computing device(s) 120 may further operate using various components as illustrated in and described with respect to FIG. 2. The speech recognition component 249 receives [1] input audio data 205 from the orchestrator component 230. The speech recognition component 249 processes the input audio data 205 to generate an N-best list of text possibly representing an utterance in the input audio data 205. The speech recognition component 249 outputs [2] N-best recognitions data 210, including text representing the generated N-best recognitions, to the orchestrator component 230.

Shortlister component 241 may receive [3*b*] the N-best recognitions data 210 from the orchestrator component 230. Shortlister 241 may be trained using a set of applications (or "skills"). As described in further detail below, for each application in the set of applications, shortlister component 241 may determine a probability (e.g., a score) that the application is applicable to generate a response to the utterance. Shortlister component 241, orchestrator 230, and/or some other processing component of computing device(s) 120 may determine a subset of the applications based on the probabilities determined by shortlister component 241. In various examples, shortlister 241 may determine the probabilities by comparing vector data representing the input text (e.g., the input utterance or text representing the utterance) to utterances provided for a set of skills for which the shortlister machine learning model has been trained to determine similarities between the input utterance and the utterances provided for each skill of the set of skills. Shortlister component 241 may send [3*c*] the subset of applications and/or the determined probabilities to orchestrator 230. In various examples, to the extent that the natural language component 259, the dialog state manager 240, the core dialog manager 260, and/or other components of computing device(s) 120 select an application to process the utterance (and/or input text), the natural language component 259, the dialog state manager 240, the core dialog manager 260, and/or other components of computing device(s) 120 may select the application from the subset of applications and/or based on the probabilities determined by shortlister component 241.

The natural language component 259 receives [3a] the N-best recognitions data 210, the application-specific probabilities determined by shortlister component 241, and/or the subset of applications determined by shortlister component 241 or by some other processing unit from the orchestrator component 230. The natural language component 259 processes the N-best recognitions data 210, the application-specific probabilities, and/or the subset of applications to determine one or more domains of the computing device(s) 120 for the utterance. Each domain may be associated with a separate recognizer implemented within the natural language component 259. A recognizer may include an NER component and an IC component as described above. The natural language component 259 outputs [4] N-best intents data 215, representing an N-best list of the top scoring intents associated with the utterance (as received by the computing device(s) 120 as either a spoken utterance or textual input) to the orchestrator component 230 based on the subset of applications and/or the application-specific probabilities determined by shortlister 241. The orchestrator component 230 may send [5] the input audio data 205, the N-best recognitions data 210, the N-best intents data 215, the subset of applications, the application-specific probabilities determined by shortlister component 241, additional data, and/or any combination thereof to the dialog state manager 240.

The computing device(s) 120 may further include one or more context services 220. A context service 220 may be configured to output non-user specific context data, such as temporal information (e.g., time of day). A context service 220 may also be configured to output metadata associated with the device from which the user command was received. Examples of device metadata may include the type of device (e.g., car, phone, speaker, etc.) A context service 220 may further be configured to output data indicating previously received user commands and their determined intents. While FIG. 2 illustrates the context services 220 as a separate component, the disclosure is not limited thereto and one or more context services 220 may be included in the natural language component 259 without departing from the disclosure. The context services 220 may generate context data 225, which may include information about the dialog context and/or other information. Thus, FIG. 2 illustrates the context services 220 sending [6] the context data 225 to the dialog state manager 240. However, the disclosure is not limited thereto and the context services 220 may send the context data 225 to the dialog state manager 240, the natural language component 259 and/or the orchestrator 230 without departing from the disclosure.

In some examples, the context services 220 may include additional information relevant to applications and/or intents. For example, the context services 220 may include information about application ratings (e.g., 5 star rating for a first application and a 4 star rating for a second application), enabling the computing device(s) 120 to differentiate between similar applications based on ratings. In some other examples, the context services 220 may send the application probabilities determined by shortlister component 241 to dialog state manager 240. Additionally or alternatively, the context services 220 may have location information associated with applications, enabling the computing device(s) 120 to select the first application in a first location and the second application in a second location. For example, the first application (e.g., Skill A corresponding to a first transportation company) may not have availability in certain cities, while the second application (e.g., Skill B, corresponding to a second transportation company) has availability, so the computing device(s) 120 may select the second application when the user requests a cab in locations that the first application lacks coverage. Similarly, the context services 220 may include information about context of a user request, enabling the computing device(s) 120 to select a first application based on a first user request but select a second application based on a second user request. For example, a first user request (e.g., "What is the weather?") may result in the computing device(s) 120 choosing a first application (e.g., Weather skill), whereas a second user request (e.g., "What is the wind?") may result in the computing device(s) 120 choosing a second application (e.g., PredictWind skill), despite the similarity in the user requests.

The computing device(s) 120 may additionally include one or more personal graph services 230. A personal graph service 229 may track user interactions with the system 100 and store previous interactions, user preferences and/or other user-specific information used to build a user profile. Thus, the personal graph services 229 may generate personal graph data 255 and may send [7] the personal graph data to the dialog state manager 240 to include in the dialog state. In some examples, the personal graph data includes information specific to the current dialog state. For example, if the user request indicates that the user would like to request a ride, the personal graph data may indicate a first number of times that the user has used a first application (e.g., Skill A) and a second number of times that the user has used a second application (e.g., Skill B). This information is specific to the user but also relevant to the current dialog state. However, the disclosure is not limited thereto and the personal graph data may include additional information without departing from the disclosure.

While the abovementioned examples illustrate the personal graph service 229 being tailored to a specific user, the disclosure is not limited thereto. In some examples, the personal graph service 229 may provide information according to different hierarchies. As discussed above, the personal graph service 229 may provide profile data on a user level (e.g., based on a system interaction history specific to a user ID associated with a user from which the current command originated). In addition, the personal graph service 229 may alternatively provide profile data on a device level (e.g., based on a system interaction history specific to a device ID associated with the device from which data corresponding to the current command was received). Additionally or alternatively, the personal graph service 229 may provide profile data on a user and device level (e.g., based on a system interaction history specific to a user ID as well as a device ID).

The dialog state manager 240 may receive [5] various inputs from the orchestrator 230, such as the input audio data 205, the N-best recognitions data 210, the subset of applications and/or the application probabilities determined by shortlister 241, and/or the N-best intents data 215. In addition, the dialog state manager 240 may receive [6] the context data 225 from the context service 220 and may receive [7] the personal graph data from the personal graph service 229. The dialog state manager 240 may generate dialog state data 245, including all of the data received that is associated with a current exchange with the user, as discussed in greater detail below with regard to FIG. 7. The dialog state manager 240 may send [8] the dialog state to the user satisfaction estimator 250.

The user satisfaction estimator 250 may receive [8] the dialog state data 245 and may generate user satisfaction data 256, which may be a scalar value (e.g., between 1 and 5) that corresponds to an estimate of user satisfaction at a particular point in time. The user satisfaction estimator 250 may send [9] the user satisfaction data 256 to the dialog state manager 240 and the dialog state manager 240 may update the dialog state data 245 to include the user satisfaction data 256.

The dialog state manager 240 may send [10] the dialog state data 245 to the orchestrator 230 and/or the core dialog manager 260. Additionally or alternatively, the orchestrator 230 may send [11] the updated dialog state to the core dialog manager 260. The core dialog manager 260 may use rule-based candidate generators and/or machine learning candidate generators (e.g., Deep Neural Network (DNN) generators) to generate candidate actions and/or applications based on the dialog state data 245 and may use rule-based selectors and/or machine learning selectors (e.g., DNN selectors) to select a single action from the candidate actions. Similarly, the core dialog manager 260 may use rule-based candidate selectors and/or machine learning candidate selectors (e.g., DNN selectors) to select a single application from the candidate applications to perform the action. In various examples, the probabilities generated by shortlister component 241 and/or the subset of applications determined by shortlister component 241 based on the probabilities may be used as an input signal to rule-based candidate selectors and/or machine learning candidate selectors to select the single application. The core dialog manager 260 may generate action data 265 that indicates the selected action, which may correspond to a dialog request or a dispatch request, and may send [12] the action data 265 to the orchestrator 230 and/or the dialog state manager 240 (e.g., via the orchestrator 230).

The dialog state manager 240 may receive [13] the action data 265 and may update the dialog state data 245 again to include the action data 265. The dialog state manager 240 may send [14] the updated dialog state data 245 to the orchestrator 230, which may send [15] the updated dialog state data 245 to a dialog execution engine 270. The dialog execution engine 270 may receive [15] the updated dialog state data 245, including the action data 265, and may determine whether the action data 265 indicates that the dialog execution engine 270 should dispatch the action to an application (e.g., dispatch request) or to generate a prompt requesting additional information from the user (e.g., dialog request). For example, if the action data 265 includes a dispatch request, the dialog execution engine 270 may send [16A] the action data 265 and/or the dialog state data 245 to the application 290 specified by the action data 265. The application 290 may use rule-based action generators to generate candidate actions based on the dialog state data 245 and may use rule-based selectors and/or machine learning selectors (e.g., DNN selectors) to select a single action from the candidate actions. The application 290 may generate a prompt corresponding to the selected action and may generate an updated dialog state, which may be sent [17A] to the TTS component 280.

In contrast, if the action data 265 includes a dialog request, the dialog execution engine 270 may generate a prompt soliciting additional information from the user and may send [16B] the prompt and/or the dialog state data 245 to the TTS component 280. The solicitation may take the form of text output via a display of a user device or audio output by a speaker of a user device. Accordingly, if the solicitation to the user is to be audio, the TTS component 280 may generate output data 285 that includes output audio data based on the text data of the prompt. If the solicitation to the user does not include audio, the TTS component 280 may generate output data 285 that only includes the text data of the prompt. The TTS component 280 may send [18] the output data 285 and/or additional data received from the dialog execution engine 270 or the application 290 to the orchestrator component 230 and the orchestrator component 230 may send [19] the output data 285 and/or the additional data to the dialog state manager 240, which may update the dialog state data 245 again.

In some examples, the core dialog manager 260 may determine that the dialog state data 245 includes enough information to select an action and generate a dispatch request to dispatch the selected action and/or dialog state to the selected application. For example, in response to a user request to "book me a cab to Favorite Bar," the core dialog manager 260 may determine that the intent is to book a cab (e.g., GetCabIntent) and may generate candidate actions associated with booking a cab, such as a first action using a first application (e.g., Skill A) and a second action using a second application (e.g., Skill B). In various examples, Skill A and Skill B may be included in a subset of applications determined by shortlister component 241 for the utterance "book me a cab to Favorite Bar". In various other examples, the probabilities that Skill A and Skill B are appropriate applications to process the utterance "book me a cab to Favorite Bar" may exceed a probability threshold. In still other examples, the probabilities that Skill A and Skill B are appropriate applications to process the utterance "book me a cab to Favorite Bar" may be among the highest probabilities determined by shortlister component 241 for the set of skills for which shortlister component 241 has been trained. The core dialog manager 260 may communicate with the first application and/or the second application to acquire more information, such as whether cars are available (e.g., Skill A indicates that no cars are available for 30 minutes, whereas Skill B indicates that a car is available within 5 minutes). Based on the dialog state data 245 and the additional information, the core dialog manager 260 may select the second action and generate a dispatch command, with the action data 265 indicating that the system 100 should dispatch the second action to the second application.

In some examples, dispatching the second action to the second application corresponds to sending the second action (e.g., Dispatch(Skill B: GetCabIntent(Current location: 2121 7$^{th}$ Avenue Seattle, Destination: Favorite Bar)) to the second application for execution. However, the second action is determined by the core dialog manager 260 processing the dialog state data 245 and the core dialog manager 260 is not specifically trained for intents/actions associated with the second application. Therefore, dispatching the second action to the second application may instead correspond to updating the dialog state data 245 with the second action and/or any additional information and sending the dialog state data 245 to the second application for further processing. For example, the core dialog manager 260 may send the selected action (e.g., Dispatch(Skill B: GetCabIntent(Current location: 2121 7$^{th}$ Avenue Seattle, Destination: Favorite Bar)), the additional information (e.g., Skill A indicates that cars are not available for 30 minutes, Skill B indicates that cars are available within 5 minutes) and/or any other information (e.g., Reason: Skill A outage) to the dialog state manager 240, the dialog state manager 240 may update the dialog state data 245 accordingly and the updated dialog state data 245 may be sent to the second application.

While the examples described above illustrate the second action including an intent (e.g., Dispatch(Skill B: GetCabIntent)), the disclosure is not limited thereto and the second action may only correspond to dispatching to the second application (e.g., Dispatch(Skill B)). Thus, the core dialog manager 260 may generate candidate actions corresponding to a specific intent associated with a specific application, or the candidate actions may correspond to a specific application regardless of intent. To illustrate an example of the candidate actions including specific intents, the core dialog manager 260 may generate Dispatch(Skill B: GetCabIntent), Dispatch(Skill B: ViewNearbyCabsIntent), Dispatch(Skill A: GetCabIntent), Dispatch(Skill A: ViewNearbyCabsIntent), etc. and selecting a single action indicates both the application (e.g., Skill A or Skill B) and the intent (e.g., GetCabIntent or ViewNearbyCabsIntent). Thus, selecting the candidate action corresponds to selecting an intent associated with a specific application, which may assist the core dialog manager 260 in selecting between different applications. Additionally or alternatively, the core dialog manager 260 may generate candidate actions based on available applications, regardless of intent. For example, the core dialog manager 260 may generate Dispatch(Skill A), Dispatch(Skill B), etc. and selecting a single action indicates the application to which to dispatch the dialog state data 245. Thus, selecting the candidate action corresponds to sending the dialog state data 245 to the specific application (e.g., Skill B) and the application determines the intent. Additionally or alternatively, the core dialog manager 260 may generate candidate actions based on the application probabilities determined by skill shortlister component 241 and included in dialog state data 245.

In some examples, the core dialog manager 260 may determine that the dialog state data 245 does not include enough information to select an action and generate a dispatch command to dispatch the selected action and/or dialog state to a corresponding application. Instead, the core dialog manager 260 may determine that additional information is needed from the user and may generate a dialog request to solicit the user for the additional information. For example, if the core dialog manager 260 determines one or more intents/actions that may correspond to the speech, but none of the intents/actions are associated with a confidence value meeting or exceeding a threshold value, the core dialog manager 260 may generate a dialog request that requests additional information. While the core dialog manager 260 may dispatch an action despite the confidence score being below the threshold value, a lower confidence score corresponds to an increased likelihood that the selected action is not what the user intended. Thus, dispatching the action may result in performing a command that is different than the user requested, resulting in a lower user satisfaction value after the command is executed.

In order to increase the likelihood that the action selected by the core dialog manager 260 corresponds to the user request, the core dialog manager 260 may generate a dialog request requesting additional information and/or clarification from the user. For example, in response to a request to "book a flight to Portland," the core dialog manager 260 may generate a dialog request and the computing device(s) 120 may solicit the user as to whether Portland corresponds to Portland, Oreg. or Portland, Me. (e.g., "Would you like to fly to Portland, Oreg., or to Portland, Me.?"). For example, the action data 265 may include the dialog request and the dialog execution engine 270 may interpret the action data 265 to generate a prompt corresponding to the solicitation. As discussed above, the solicitation may take the form of text output via a display of a user device or audio output by a speaker of a user device. In addition, the solicitation may be output by a device different from the device that received the speech. For example, the first device 110a may generate the input audio data but the second device 110b may output the solicitation to the user. Accordingly, if the solicitation to the user is to be audio, the TTS component 280 may generate output audio data based on the text data of the prompt and the second device 110b may output audio corresponding to the output audio data.

While FIG. 2 illustrates specific routing between components, this is intended to illustrate a single example and the disclosure is not limited thereto. For example, FIG. 2 illustrates the action data 265 being sent from the core dialog manager 260 to the orchestrator component 230 and from the orchestrator component 230 to the dialog state manager 240, and updated dialog data (including the action data 265) being sent from the dialog state manager 240 to the orchestrator component 230, from the orchestrator component 230 to the dialog execution engine 270, and from the dialog execution engine 270 to the application 290. However, the disclosure is not limited thereto and the dialog data can be routed to any of the components illustrated in FIG. 2 without departing from the disclosure. Thus, any decision making performed by any component in the system 100 may be performed using information (e.g., dialog state data 245) stored in the dialog state manager 240 without departing from the disclosure.

While FIG. 2 illustrates the core dialog manager 260 as a discrete component configured to make decisions for the system 100, and the example described above illustrates the core dialog manager 260 assisting other components in making decisions, the disclosure is not limited thereto. Instead, the core dialog manager 260 may be completely decentralized and individual components may include machine learning models that enable the component(s) to make decisions and optimize user satisfaction over time (collectively, the machine learning models may correspond to the core dialog manager 260). Thus, the core dialog manager 260 may be illustrated as a single component, as a separate component while also being included within individual components, or only within individual components (e.g., without a separate block receiving [11] dialog data and sending [12] action data) without departing from the disclosure.

FIG. 3 is an example diagram showing various components of a shortlister 300, in accordance with various embodiments described herein. In various examples, shortlister 300 depicted in FIG. 3 may be an example of a shortlister component 241 described above in reference to FIGS. 2 and 3. In various examples, orchestrator 230 and/or speech recognition component 249 may send text data to the shortlister component 241. Text data received by shortlister component 300 may be embedded as utterance 302 for processing by shortlister 300. Utterance 302 may comprise words $w_1 \ldots w_n$ and characters $c_{1,1} \ldots c_{n,m}$. Accordingly, words of the utterance 302 received by shortlister 300 may be embedded as word embedding 304 and characters of the words of 302 may be embedded as character embedding 306.

Shortlister 300 may comprise a character-level BiLSTM 308 and a word-level BiLSTM 310 as depicted in FIG. 3. However, in at least some examples, different neural network models may be used in place of one or more of the LSTMs described herein. In some examples, word-level BiLSTM 310 and character-level BiLSTM 308 may comprise utterance encoder 242 described above in reference to FIG. 2. As described in further detail below, character-level BiLSTM 308 may be trained to generate a character-sensitive word representation vector representing utterance 302. Additionally, word-level BiLSTM 310 may be trained to determine a character-sensitive and context-sensitive word vector data 312 representing utterance 302. Vector data 312 may represent the utterance 302 and may be encoded by the word-level BiLSTM 310 and character-level BiLSTM 308 so as to represent syntax and/or semantics of utterance 302. Vector data 312 may be sent to various skills $s^1 \ldots s^k$ (sometimes referred to herein as applications) in skill feedforward layer 314 (sometimes referred to herein as "application feedforward layer" or "application-specific feedforward layer") of shortlister 300. Skill feedforward layer 314 may be a feedforward machine learning layer. In various examples, skill feedforward layer 314 may comprise one or more classifiers with each classifier corresponding to a particular one of skills $s^1 \ldots s^k$. In at least some examples, the classifiers of skill feedforward layer 314 may be logistic regression models, although in some other examples, other types of classifiers may be used (e.g., linear regression, decision tree models, support vector machines, K-Nearest Neighbors, etc.). For each of skills $s^1 \ldots s^k$ probability data may be determined. The probability data may indicate respective probabilities, for each skill, that the particular skill corresponds to utterance 402. In other words, a high probability for a first skill may indicate that the first skill is likely to be configured to accurately process the utterance 302 (e.g., to generate accurate response data). Accordingly, shortlister 300 may generate probability data comprising a set of probabilities corresponding to the applicability of skills $s^1 \ldots s^k$ to utterance 302. In various other examples, shortlister 300 may determine a subset of the skills $s^1 \ldots s^k$ applicable to utterance 302.

In various examples, the probability data determined by shortlister 300 (and/or by shortlister 400 depicted in FIG. 4) may be sent to orchestrator 230 and/or to natural language component 259. Natural language component 259 may consider the probability data when selecting a skill for processing a particular utterance.

During training of shortlister 300, each skill $s^1 \ldots s^k$ has two-class training data specific to that skill. The two-class training data comprises utterances that belong to the skill (e.g., utterances that are applicable to be processed by the skill) and out-of-skill (OOS) utterances (e.g., utterances that are not applicable to be processed by the skill). The shortlister 300 model is jointly trained for all skills $s^1 \ldots s^k$ available at training time with the skill-specific feedforward regression layer for each skill. The loss may be defined as the combination of losses for these feedforward layers, which may be jointly minimized. When new skills are added to the model, only classifiers for the newly-added skills may be trained rather than the entire model of shortlister 300. For example, if shortlister 300 has previously been trained for classifiers of skills $s^1 \ldots s^k$, and a new skill $s^{k+1}$ is added, only the classifier for skill $s^{k+1}$ may be trained, while the weights of the shared utterance encoder (e.g., word-level BiLSTM 310 and character-level BiLSTM 308) that embed utterance 302 may be maintained. Accordingly, the word-level BiLSTM 310 and character-level BiLSTM 308 layers may be considered a shared, non-skill-specific encoder that may be used to generate a vector data representing utterances (e.g., vector 312).

For example, vector data 312 may be a vector of 200 dimensions representing syntax and/or semantics of the embedded utterance 302. Skill $s^{k+1}$ may be a newly added skill (e.g., added after shortlister 300 has been trained for skills $s^1 \ldots s^k$). A classifier of skill $s^{k+1}$ in skill feedforward layer 314 may be a binary classifier. Output 320 may indicate the probability for a given utterance that skill $s^{k+1}$ is not applicable to the utterance. Output 322 may indicate the probability for the given utterance that skill $s^k$ is applicable to the utterance. In various examples, to train the binary classifier for skill $s^{k+1}$, a 200×2 matrix specific to the outputs of skill $s^{k+1}$ for the 200 dimensional utterance vector data may be trained in order to incorporate the binary classifier for skill $s^{k+1}$ into shortlister 300. In other words, weight values of the 200×2 matrix may be determined and/or adjusted during training such that calculated outputs of the binary classifier for skill $s^{k+1}$ match expected outputs for a given set of input data (e.g., inputs and expected outputs). Weights of the shared, non-skill-specific encoder (e.g., word-level BiLSTM 310 and character-level BiLSTM 308 layers) may be unaffected by training of skill $s^{k+1}$.

After a plurality of new skills have been added to the skill feedforward layer 314, the entire model of shortlister 300 (including the shared, non-skill-specific encoder) may be retrained to account for the plurality of new skills as well as the new vocabulary, syntax, and/or semantic information implicated by the plurality of new skills. In various examples, the entire model of shortlister 300 may be retrained periodically (e.g., weekly, bi-weekly, etc.). In some other examples, a decision as to whether to retrain the entire model of shortlister 300 may be made based on a number of skills added and/or based on a measure of the vocabulary, syntax and/or semantic information introduced by newly added skills. As retraining the entire model may be computationally expensive and/or time consuming, it may be advantageous to minimize the frequency of retraining of the model. Accordingly, training individually-added skills as opposed to the entire model including the shared, non-skill-specific encoder may be generally preferable to retraining the entire model of shortlister 300.

Shared, Non-Skill-Specific Encoder

The shared, non-skill-specific encoder (e.g., character-level BiLSTM 308 and a word-level BiLSTM 310) may map $\phi: \mathbb{R}^d \times \mathbb{R}^{d'} \rightarrow \mathbb{R}^{d'}$ and may receive a d dimensional input vector x and a d' dimensional state vector h to generate a new d' dimensional state vector h'=$\phi$(x, h).

Let C denote the set of character types and W the set of word types. Let $\oplus$ denote the vector concatenation operation. Utterance 302 may be encoded using BiLSTMs 308 and 310. Model parameters $\Theta$ associated with the BiLSTM layers include:

Character embedding $e_c \in \mathbb{R}^{25}$ for each $c \in C$

Character LSTMs $\phi_f^c, \phi_b^c: \mathbb{R}^{25} \times \mathbb{R}^{25} \rightarrow \mathbb{R}^{25}$ Word embedding $e_w \in \mathbb{R}^{100}$ for wach $w \in W$ Word LSTMs $\phi_f^w, \phi_b^w: \mathbb{R}^{150} \times \mathbb{R}^{100} \rightarrow \mathbb{R}^{100}$ $w_1 \ldots w_n \in W$ may denote a word sequence where word $w_i$ has character $w_i(j) \in C$ at position j. First, the shared, non-skill-specific encoder may generate a character-sensitive word representation vector $v_i \in \mathbb{R}^{150}$ as:

$$f_j^c = \phi_f^c(e_{w_i(j)}, f_{j-1}^c) \forall_j = 1 \ldots |w_i|$$

$$b_j^c = \phi_b^c(e_{w_i(j)}, b_{j+1}^c) \forall_j = |w_i| \ldots 1$$

$$v_i = f_{|w_i|}^c \oplus b_1^c \oplus e_{w_i}$$

for each i=1 ... n. Some random initial state vectors (e.g., $f_0^c$ and $b_{|w_i|+1}^c$) may be used for the LSTMs in layers 308 and/or 310.

Next, the shared, non-skill-specific encoder may determine $$f_i^W = \phi_f^W(v_i, f_{i-1}^W) \forall_i = 1 \ldots n$$

$$b_i^W = \phi_b^W(v_i, b_{i+1}^W) \forall_i = n \ldots 1$$

and may induces a character-sensitive and context-sensitive word representation vector $h_i \in \mathbb{R}^{200}$ as:

$$h_i = f_i^w \oplus b_i^w$$

for each i=1 ... n. The entire operation may be written as a mapping $BiLSTM_\Theta$:

$$(h_1 \ldots h_n) \leftarrow BiLSTM_\Theta(w_1 \ldots w_n) \quad (2)$$

$$\overline{h} = \sum_{i=1}^{n} h_i$$

Skill-Specific Feedforward Layer $w_1 \ldots \in W$ may be an utterance in skill $d \in \{POS, NEG\}$ (e.g., utterance 302). The shared, non-skill-specific encoder may be used to generate the utterance representation $\overline{h}$:

$(h_1 \ldots h_n) \leftarrow BiLST_\Theta(w_1 \ldots w_n)$ (e.g., vector data 312).

The probability that a skill s is applicable for the utterance may be:

z=tan h(W·$\overline{h}$+b)

$p(d|\overline{h}) \propto \exp([z]_d)$, where b is a bias.

$\theta^{domain} = \{W, b\}$ may denote additional feed-forward parameters. For example, The domain classification loss may be determined using the negative log likelihood:

$L^{domain}(\theta, \theta^{domain}) = -\Sigma_i \log p(d^{(i)}|w^{(i)})$ iterated over domain-annotated utterances $(w^{(i)}, d^{(i)})$.

The sum of the domain loss across all skills may be minimized during training.

Figure 4:
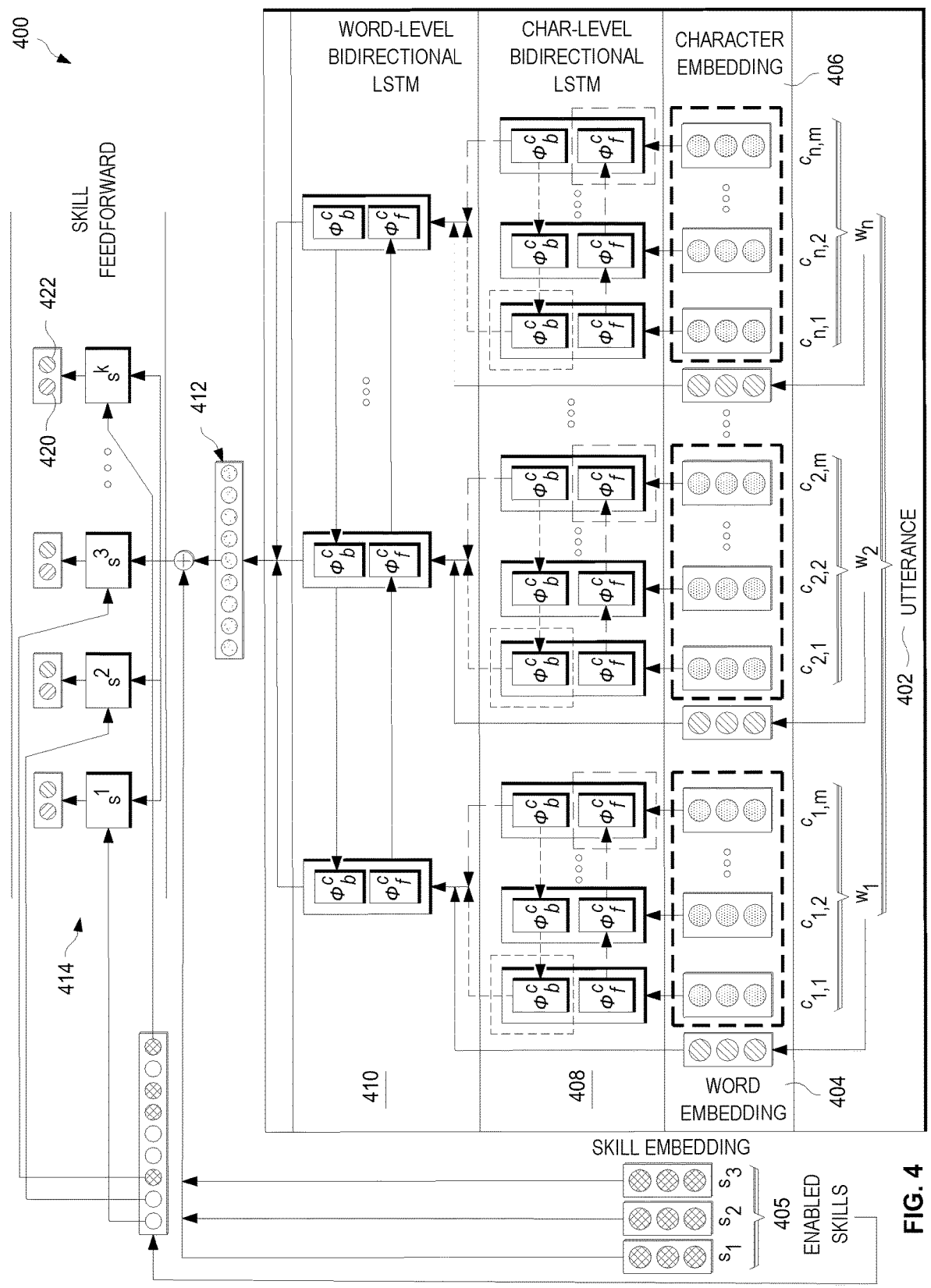
FIG. 4 is a conceptual diagram depicting a personalized shortlister, in accordance with various aspects of the present disclosure.

FIG. 4 is an example diagram depicting a personalized shortlister 400, in accordance with various aspects of the present disclosure. In various examples, in order to use the functionality provided by a skill (e.g., an application), the user first enables the skill. Enabling a skill may associate the skill with a user account that may, in turn, be associated with one or more computing devices (e.g., devices 110a, 110b from FIG. 1). Enabling a skill may permit the skill's functionality to be used. Users may enable skills in various ways. For example, a user may manually enable a skill through a companion application and/or web browser. In some other examples, a user may enable a skill using a voice command. For example, the user may say "Computer, enable skill name." Once the user has enabled a skill, the user may launch the skill by (1) opening the skill with commands such as "Computer, open skill name" before interaction with the skill, and by (2) saying utterances (or inputting text) that conform to the supported or predefined invocation patterns, such as "Computer, ask skill name to do requested action". In some examples, a skill may be automatically enabled by the user opening the skill. For example, a user saying "Computer, open Skill A" may automatically enable Skill A and allow interaction with Skill A. The request may be passed on to a backing web service created by the developer of the skill (e.g., a web service performed by computing device(s) 120 and/or 125).

In various examples, third-party developers may use various APIs and/or skill development kits to create their own skills. As more and more developers create their own skills, the number of skills available may increase dramatically over time. Additionally, many skills may have redundancy with respect to other skills. In other words, skills may have overlapping capabilities. Accordingly, determining the highest probability skills for a particular utterance may be difficult when evaluating a set including two or more similar skills (e.g., skills that may have redundant capability for the utterance). In various embodiments described herein, skill enablement information (e.g., a skill enablement vector or signal) may be used as a signal to reduce misinvocation by limiting the decision inside the enabled skills. Accordingly, the model depicted in FIG. 4 may be described as a personalized shortlister 400 as skill enablement information may be used to determine the probability that particular vector data representing an utterance (e.g., vector data 412) is appropriate for a particular skill.

Skill attention may be determined based on the similarity between the utterance representation (e.g., vector data 412) and the enabled skills by the user (e.g., enabled skills 405).) $S^{(1)} \ldots S^{(K)} \in R^{d'}$ may denote the d' dimensional skill embedding of the user's enabled skills 405 and $\overline{h} \in R^{d'}$ may denote the d' dimensional utterance representation calculated by eq. (3).

The skill attention weight may be determined using various functions. For example, equations 4-7 below are examples of equations that may be used to determine the skill attention weight.

Dot-product function:

$$q_k^{dot} = \overline{h}^T \cdot S^{(k)} \forall k = 1 \ldots K \quad (4)$$

Bilinear function:

$$q_k^{bi} = \overline{h}^T \cdot B \cdot S^{(k)} \forall k = 1 \ldots K \quad (5)$$

where B is an additional model parameter.
Feedforward function:

$$\overline{q}_k = (U \cdot \overline{h}^T + V \cdot S^k + b^1) \quad (6)$$

$$q_k^{feed} = W \cdot \tan h(z_k) + b^2 \forall k = 1 \ldots K \quad (7)$$

where U, V, W, $b^1$, $b^2$ are additional model parameters.

The final attention weights $a=(a_1 \ldots a_k)$ may be determined after being normalized by a softmax layer (e.g., a normalized exponential function):

$$a_i = \frac{\exp(q_i)}{\sum_{k=1}^{K} \exp(q_k)} \forall i = 1 \ldots K$$

The weighted combination of skill embedding as a skill enablement representation my be determined using:

$$\overline{S}^{enablement} = \sum_{K=1}^{K} (a_k \cdot S^k)$$

The skill enablement representation generated using equation (9) may be concatenated with the utterance representation (e.g., vector data 412) as depicted in FIG. 4 to generate a concatenated vector. Accordingly, the personalized shortlister 500 may predict the probabilities that a skill s is applicable for a particular utterance using:

$$\bar{z} = \bar{h} \oplus \bar{s}^{enablement} \tag{10}$$

$$z = \tan h(W \cdot \bar{z}) + b \tag{11}$$

In various examples, out-of-domain (OOD) skills/applications may be defined for the shortlister models described herein as a skill equipped to handle any utterance that is not applicable for the skills $s^1 \ldots s^k$ for which the shortlister 400 has been trained. In various examples, if the probability that a particular utterance is applicable to the OOD skill is higher than any of the probabilities that the utterance is applicable to skills $s^1 \ldots s^k$, all probabilities for the skills $s^1 \ldots s^k$ may be ignored as a determination may be made that the utterance relates to a different domain and is not applicable for any of skills $s^1 \ldots s^k$. Upon determination that a particular utterance is applicable to an OOD skill, computing device(s) 120 may generate a system-level response. In various examples, the response may be to await the next utterance or input as the OOD utterance may be noise. In various other examples, the response may be to send text representing the OOD utterance to a search engine. In yet other examples, the computing device(s) 120 may be effective to output speech requesting user clarification in response to a determination that the utterance is out of domain.

Figure 5:
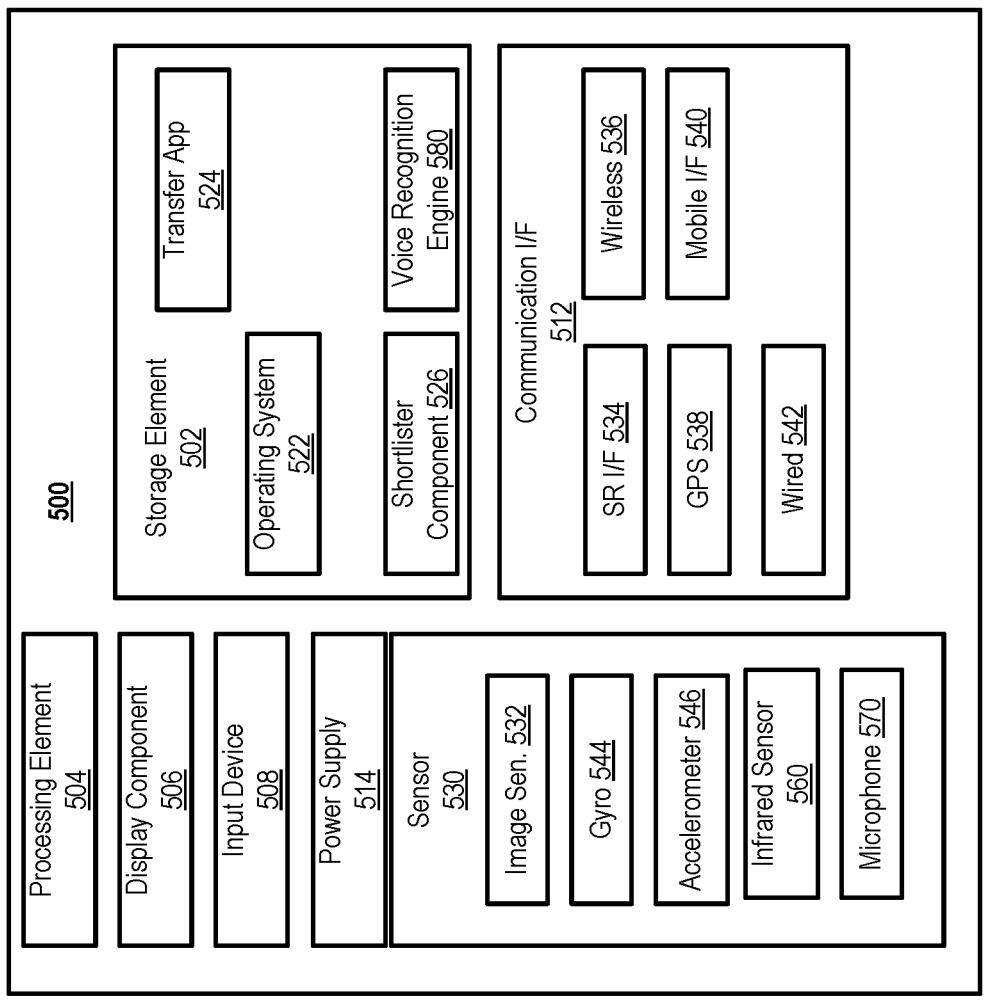
FIG. 5 is a block diagram conceptually illustrating an example architecture of a computing device that may be used in accordance with various techniques described herein.

FIG. 5 is a block diagram showing an example architecture 500 of a computing device, such as device 110*a*, 110*b*, computing device(s) 120, 125, in accordance with various aspects of the presented disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine probabilities that particular skills are applicable to process a given input utterance, as described above in reference to FIGS. 4 and 5. The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500. In some examples, the transfer application 524 may also be configured to send the received voice commands to one or more voice recognition servers (e.g., computing device(s) 120).

In some examples, storage element 502 may include a shortlister component 526. The shortlister component may be effective to generate vector data representing an utterance and/or text data and may determine probabilities that various skills may be applicable to perform an action in response to the utterance and/or text data.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice commands. Voice recognition engine 580 may interpret audio signals of sound captured by microphone 570. In some examples, voice recognition engine 580 may listen for a "wake-word" to be received by microphone 570. Upon receipt of the wake-word, voice recognition engine 580 may stream audio to a voice recognition server for analysis, as described above in reference to FIG. 2. In various examples, voice recognition engine 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

Motion sensors may include any sensors that sense motion of the architecture including, for example, gyro sensors 544 and accelerometers 546. Motion sensors, in some examples, may be used to determine an orientation, such as a pitch angle and/or a roll angle, of a device. The gyro sensor 644 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 546 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 538 may be utilized as a motion sensor. For example, changes in the position of the architecture 500, as determined by the GPS interface 538, may indicate the motion of the GPS interface 538. Infrared sensor 560 may be effective to determine a distance between a surface and the device including the infrared sensor 560. In some examples, the infrared sensor 560 may determine the contours of the surface and may be capable of using computer vision techniques to recognize facial patterns or other markers within the field of view of the infrared sensor 560's camera. In some examples, the infrared sensor 560 may include an infrared projector and camera. Processing element 504 may build a depth map based on detection by the infrared camera of a pattern of structured light displayed on a surface by the infrared projector. In some other examples, the infrared sensor 560 may include a time of flight camera that may compute distance based on the speed of light by measuring the time of flight of a light signal between a camera of the infrared sensor 560 and a surface. Further, in some examples, processing element 504 may be effective to determine the location of various objects in the physical environment within the field of view of a device based on the depth map created by the infrared sensor 560. As noted above, in some examples, non-infrared depth sensors, such as passive stereo camera pairs, or non-identical camera pairs, may be used in device in place of, or in addition to, infrared sensor 560. Processing element 504 may be effective to determine the location of various objects in the physical environment within the field of view of a camera of architecture 500 based on the depth map created by one or more non-infrared depth sensors.

Figure 6:
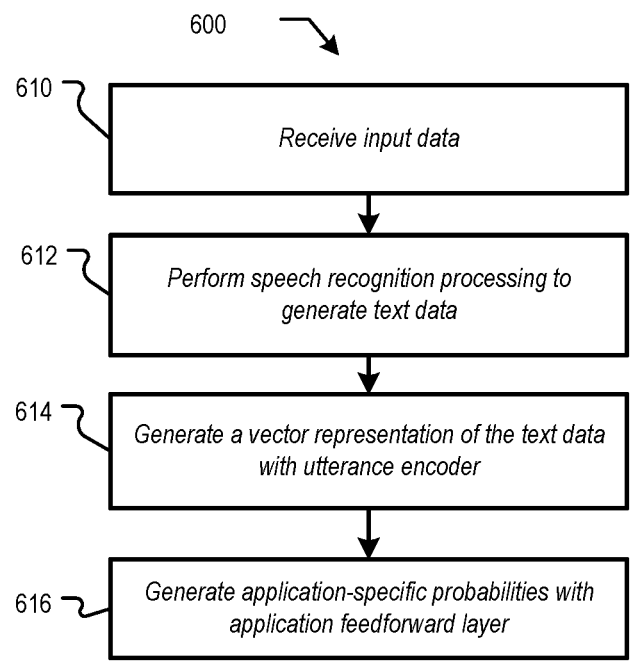
FIG. 6 depicts a flow chart showing an example process for determining a set of application-specific probabilities, in accordance with various aspects of the present disclosure.

FIG. 6 depicts a flow chart showing an example process 600 for determining a set of application-specific probabilities, in accordance with various aspects of the present disclosure. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 600 may begin at action 610, "Receive input data". At action 610, one or more computing devices (e.g., computing device(s) 120 and/or computing device(s) 125) may receive input data. In various examples, the input data may be text data. The text data may be input at another computing device (e.g., a question typed on a keyboard or display of a remote computing device). In some cases where the input data is text data, action 612 may be omitted from process 600. In other examples, the text data may be generated based on received audio data. For example, at action 612, a speech recognition component may receive audio data representing audio of a user question, request, and/or statement. The speech recognition component may convert the audio data into text data as described herein in reference to FIG. 2, for example.

In various examples, process 600 may continue from action 612 to action 614, "Generate a vector representation of the text data with utterance encoder." At action 614, a vector representation of the text data may be generated. The vector representation may be context-sensitive and may represent syntax and semantics of the text data. Generation of the vector representation by the utterance encoder is described in further detail above in reference to FIG. 3 and below in reference to FIG. 6.

Processing in process 600 may continue from action 614 to action 616, "Generate application-specific probabilities with application feedforward layer." At action 616, the vector representation of the text data may be sent to an application-specific feedforward layer. The application-specific feedforward layer may comprise a set of binary classifiers. Each of the binary classifiers may be specific to a particular application/skill. Each of the binary classifiers may be effective to output a probability that the application/skill associated with the binary classifier is appropriate to process the vector representation. Generation of the application-specific probabilities using the application feedforward layer is described in further detail above in reference to FIG. 3 and below in reference to FIG. 8.

Figure 7:
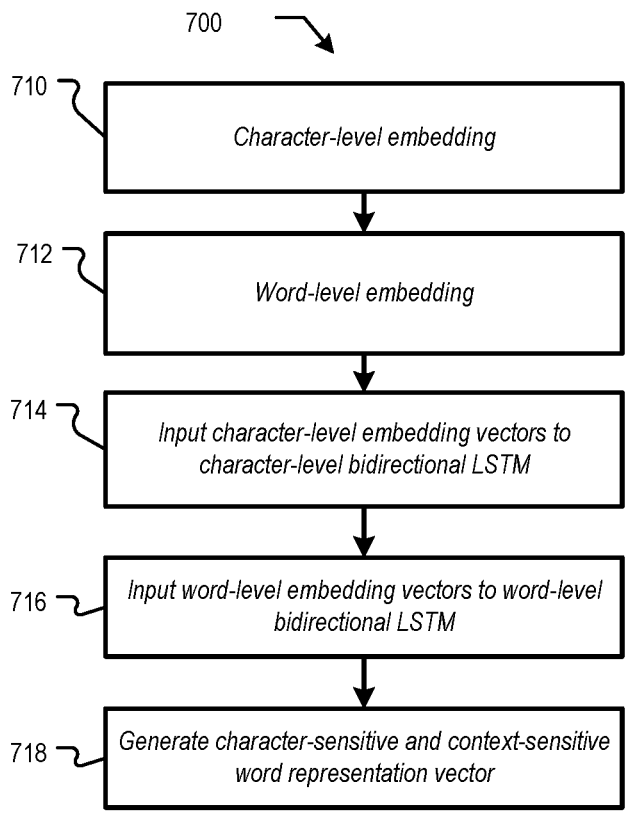
FIG. 7 depicts a flow chart showing an example process for generating a vector representation of input data using a non-application-specific utterance encoder of a machine learning model, in accordance with various aspects of the present disclosure.

FIG. 7 depicts a flow chart showing an example process 700 for generating a vector representation of input data using a non-application-specific utterance encoder of a machine learning model, in accordance with various aspects of the present disclosure. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. In various examples, the process 700 may be performed in different sequences apart from what is depicted in FIG. 7. For example, action 712 may be performed prior to, or in parallel with, action 710. Additionally, in some examples, certain actions may be removed or added to process 700. Similarly, other actions of FIGS. 6, 7 and 8 may be performed in different orders apart from what is shown. Additionally, some operations described in reference to FIGS. 6, 7 and 8 may be performed in parallel.

In some examples, the process 700 may begin at action 710. At action 710, character-level embedding vectors may be generated representing characters of the input data received at action 610. In some examples, action 712 may be performed sequentially or in parallel with action 710. At action 712, word-level embedding vectors may be generated representing the words of the input data received at action 710.

At action 714, the character-level embedding vectors may be input to a character-level BiLSTM layer. The output of the character-level BiLSTM layer may be sent to a word-level BiLSTM layer. Additionally, the word-level embedding vectors may be sent forward to the word-level BiLSTM layer, by-passing the character-level BiLSTM layer at action 716.

At action 718, the word-level BiLSTM layer, having received the output of the character-level BiLSTM layer and the word-level embedding vectors may generate character-sensitive and context-sensitive word representation vector representing the utterance (and/or text) of the input data received at action 610. The character-sensitive and context-sensitive word representation vector may comprise encoded syntax and semantics and may therefore represent a deep-learning based artificial intelligence "understanding" of the utterance (and/or text).

Figure 8:
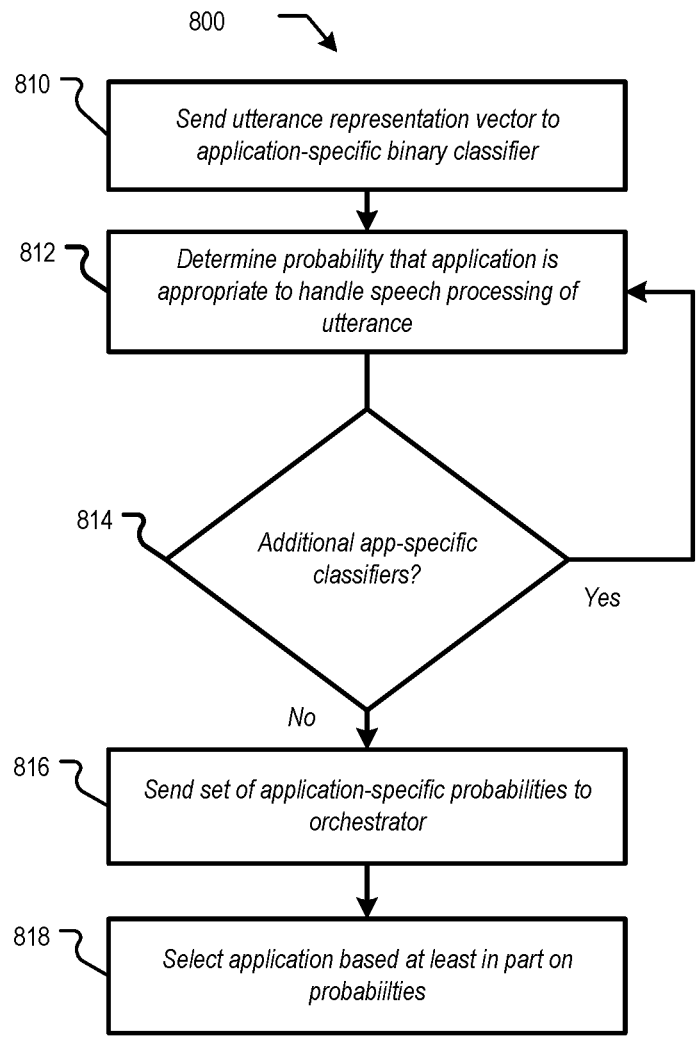
FIG. 8 depicts a flow chart showing an example process for determining a set of application-specific probabilities using a feedforward layer of a machine learning model, in accordance with various aspects of the present disclosure.

FIG. 8 depicts a flow chart showing an example process 800 for determining a set of application-specific probabilities using a feedforward layer of a machine learning model, in accordance with various aspects of the present disclosure. The actions of the process 800 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. In various examples, the process 800 may be performed in different sequences apart from what is depicted in FIG. 8. Additionally, in some examples, certain actions may be removed or added to process 800.

In various examples, process 800 may begin at action 810 "send utterance representation vector to application-specific binary classifier". At action 810 the utterance representation vector (e.g., the character-sensitive and context-sensitive word representation vector) may be sent to an application-specific feedforward machine learning layer. The application-specific feedforward machine learning layer may comprise a set of classifiers, with each classifier representing a particular speech-processing application. Each classifier may generate a probability for a given utterance that the speech-processing application associated with the classifier is appropriate to process the utterance.

Process 800 may continue from action 810 to action 812, "Determine probability that application is appropriate to handle speech processing of utterance". In various examples, at action 812, a classifier may determine the probability that a speech-processing application is appropriate (e.g., that the application can accurately process and/or respond to the utterance) to process the utterance. The utterance representation vector may be input into the classifier to determine the output probability for the application.

At action 814, a determination may be made whether or not there are additional application-specific classifiers in the feedforward layer. If so, processing may continue to action 812. Although depicted as a sequential and/or iterative process, in various examples, the processing by the various application-specific classifiers of the feedforward layer may be done in parallel.

Once all probabilities have been determined for the application-specific feedforward layer, the set of application-specific probabilities may be sent to the orchestrator (e.g., orchestrator 230) at action 816. Data sent to the orchestrator from the feedforward layer (and/or from skill shortslister 241) may comprise a probability value and an indication of the application to which the probability value applies.

Process 800 may continue from action 816 to action 818, "Select application based at least in part on probabilities". At action 818, the orchestrator, dialog manager, core dialog manager, natural language component (e.g., an NLU component), or some other downstream component of computing device(s) 120 may select an application for the particular utterance or input data.

Among other potential benefits, a system in accordance with the present disclosure may allow improved skill classification in a speech processing system. Additionally, a speech processing system arranged in accordance with various embodiments described herein may disambiguate between different potentially applicable skills based on user-specific skill enablement data. Finally, the systems described herein may offer increased scalability for newly added first party and/or third party skills. Additionally, relative to a joint machine learning model that requires retraining for each newly added skill, the various systems and techniques described herein offer reduced memory footprint and latency for training, retraining, and use of the models used to classify newly added skills.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of processing user-spoken commands, comprising:
   receiving, at a speech processing device from a user computing device, input audio data corresponding to an utterance spoken by a user of the user computing device;
   performing, by the speech processing device, a speech recognition process on the input audio data to generate first text data representing the utterance;
   determining, using a first bidirectional long short-term memory (BiLSTM) model, a character-sensitive word representation vector representing the first text data;
   determining, by a second BiLSTM model using the character-sensitive word representation vector, a character-sensitive and context-sensitive word representation vector representing the first text data;
   determining, by a first skill classifier of a skill feedforward machine learning layer using the character-sensitive and context-sensitive word representation vector, first probability data representing a first probability that a first skill is applicable to the utterance;
   determining, by a second skill classifier of the skill feedforward machine learning layer using the character-sensitive and context-sensitive word representation vector, second probability data representing a second probability that a second skill is applicable to the utterance;
   determining that the first probability is greater than the second probability; and
   sending dialog data to the first skill, wherein the dialog data is based at least in part on the first text data and the dialog data is effective to cause the first skill to generate response data representing a response to the utterance.

2. The method of claim 1, further comprising:
   determining skill enablement data indicating a set of skills enabled in association with a user account associated with the user computing device;
   generating a skill enablement vector comprising the skill enablement data; and
   concatenating the skill enablement vector with the character-sensitive and context-sensitive word representation vector to produce a concatenated vector indicating that the first skill is enabled by the user account.

3. The method of claim 1, the method further comprising determining weight values for a third skill classifier corresponding to a third skill of the skill feedforward machine learning layer to train the third skill classifier, wherein determining the weight values comprises selecting weights to conform a calculated output of the third skill classifier to an expected output for a given input.

4. A method comprising:
   receiving input data corresponding to natural language information;
   generating, by a machine learning encoder based at least in part on the input data, a vector representation of the input data;
   sending, by the machine learning encoder, the vector representation to a first classifier corresponding to a first application;
   generating, using the vector representation, first probability data that the input data corresponds to the first application, wherein the generating the first probability data comprises processing, by the first classifier, the vector representation to generate the first probability data;
   sending, by the machine learning encoder, the vector representation to a second classifier corresponding to a second application;
   generating, using the vector representation, second probability data that the input data corresponds to the second application, wherein the generating the second probability data comprises processing, by the second classifier, the vector representation to generate the second probability data; and
   selecting the first application to be included in natural language processing of the input data based at least in part on the first probability data.

5. The method of claim 4, further comprising generating, by a first layer of the machine learning encoder, character-sensitive word representation vector data representing at least one word of the input data.

6. The method of claim 5, further comprising generating, by a second layer of the machine learning encoder, the vector representation representing the input data, wherein the vector representation comprises character-sensitive and context-sensitive word representation vector data generated based at least in part on the character-sensitive word representation vector data and word embedding data corresponding to words represented in the input data.

7. The method of claim 4, further comprising determining that the first probability data indicates a higher probability than the second probability data, wherein the first probability data indicates a likelihood that the first application generates an accurate response to the input data.

8. The method of claim 4, further comprising:
generating third probability data that the input data corresponds to one or more out-of-domain applications; and
determining that the first probability data indicates a higher probability than the third probability data.

9. The method of claim 4, further comprising:
determining an indication of a subset of applications enabled in association with an account associated with the input data, wherein the subset of applications is selected from among a set of applications;
generating a signal representing the subset of applications, wherein the signal indicates that the first application is enabled by the account;
sending the signal to the first classifier associated with the first application; and
sending the signal to the second classifier associated with the second application, wherein selection of the first application is further based at least in part on the signal.

10. The method of claim 4, further comprising:
training, with first training data at a first time, the machine learning encoder, the first classifier associated with the first application, and the second classifier associated with the second application;
receiving an indication of a third application;
training, at a second time after the first time, a third classifier with second training data, the third classifier being associated with the third application;
generating, at a third time after the second time, by the machine learning encoder, a second vector representation of second input data, wherein the second vector representation is generated by the machine learning encoder as trained with the first training data; and
generating, by the third classifier using the second vector representation, third probability data that the second input data corresponds to the third application.

11. The method of claim 4, further comprising:
performing natural language processing on the input data to determine intent data based at least in part on the first probability data and the second probability data, wherein the selecting the first application to be included in natural language processing of the input data is further based at least in part on the second probability data.

12. The method of claim 4, further comprising:
determining, at a first time, a first set of weights for the machine learning encoder and the first classifier associated with the first application; and
determining, at a second time after the first time, a second set of weights for the second classifier associated with the second application.

13. A system comprising:
at least one processor; and
at least one non-transitory computer-readable medium comprising instructions effective to cause the at least one processor to:
receive input data corresponding to natural language information;
generate, by a machine learning encoder based at least in part on the input data, vector data representing the input data;
determine an indication of a subset of applications enabled in association with an account associated with the input data, wherein the subset of applications is selected from among a set of applications;
generate a signal representing the subset of applications, wherein the signal indicates that a first application is enabled by the account;
generate, using the vector data, first probability data that the input data corresponds to the first application;
generate, using the vector data, second probability data that the input data corresponds to a second application; and
select the first application to be included in natural language processing of the input data based at least in part on the first probability data and at least in part on the signal.

14. The system of claim 13, wherein the instructions are further effective to cause the at least one processor to generate, using a first layer of the machine learning encoder, character-sensitive word representation vector data representing at least one word of the input data.

15. The system of claim 14, wherein the instructions are further effective to cause the at least one processor to generate, using a second layer of the machine learning encoder, the vector data representing the input data, wherein the vector data comprises character-sensitive and context-sensitive word representation vector data generated based at least in part on the character-sensitive word representation vector data and word embedding data corresponding to words represented in the input data.

16. The system of claim 13, wherein the instructions are further effective to cause the at least one processor to determine that the first probability data indicates a higher probability than the second probability data, wherein the first probability data indicates a likelihood that the first application generates an accurate response to the input data.

17. The system of claim 13, wherein the instructions are further effective to cause the at least one processor to:
generate third probability data that the input data corresponds to one or more out-of-domain applications; and
determine that the first probability data indicates a higher probability than the third probability data.

18. The system of claim 13, wherein the instructions are further effective to cause the at least one processor to:
train, with first training data at a first time, the machine learning encoder, a first classifier associated with the first application, and a second classifier associated with the second application;
receive an indication of a third application;
train, at a second time after the first time, a third classifier with second training data, the third classifier being associated with the third application;
generate, at a third time after the second time, by the machine learning encoder, second vector data representing second input data, wherein the second vector data is generated by the machine learning encoder as trained with the first training data; and
generate, by the third classifier using the second vector data, third probability data that the second input data corresponds to the third application.

19. The system of claim 13, wherein the instructions are further effective to cause the at least one processor to:
for a third application of the set of applications, generate, using the vector data, third probability data that the input data corresponds to the third application;
determine a second subset of applications from the set of applications, wherein a fourth application of the subset of applications has fourth probability data meeting or exceeding a threshold value; and for the fourth application, perform natural language processing of the input data to determine intent data.

20. A method comprising:

receiving input data corresponding to natural language information;

generating, by a first layer of a machine learning encoder, character-sensitive word representation vector data representing at least one word of the input data;

generating, by a second layer of the machine learning encoder, second vector data representing the input data, wherein the second vector data comprises character-sensitive and context-sensitive word representation vector data generated based at least in part on the character-sensitive word representation vector data and word embedding data corresponding to words represented in the input data;

generating, using the second vector data, first probability data that the input data corresponds to a first application;

generating, using the second vector data, second probability data that the input data corresponds to a second application; and selecting the first application to be included in natural language processing of the input data based at least in part on the first probability data.

21. The method of claim 20, further comprising determining that the first probability data indicates a higher probability than the second probability data, wherein the first probability data indicates a likelihood that the first application generates an accurate response to the input data.

22. The method of claim 4, further comprising:

generating, using the vector representation, third probability data that the input data corresponds to a third application of a plurality of applications;

determining a subset of applications from the plurality of applications, wherein a fourth application of the subset of applications has fourth probability data meeting or exceeding a threshold value; and for the fourth application, performing natural language processing of the input data to determine intent data.

23. The method of claim 4, further comprising:

generating, by the machine learning encoder based at least in part on the input data, the vector representation of the input data, wherein the machine learning encoder is trained for the first application and not trained for the second application.

* * * * *